US011423259B1

(12) United States Patent
Pratusevich et al.

(10) Patent No.: US 11,423,259 B1
(45) Date of Patent: Aug. 23, 2022

(54) TRAINED MODEL APPROXIMATION

(71) Applicant: Amazon Technologies, Inc., Seattle, WA (US)

(72) Inventors: Michele Pratusevich, Somerville, MA (US); Jeremy Samuel De Bonet, Southborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 1279 days.

(21) Appl. No.: 15/838,813

(22) Filed: Dec. 12, 2017

(51) Int. Cl.
| G06K 9/62 | (2022.01) |
| G06N 3/04 | (2006.01) |
| G06F 9/50 | (2006.01) |
| G06N 20/00 | (2019.01) |

(52) U.S. Cl.
CPC ............. *G06K 9/6262* (2013.01); *G06F 9/50* (2013.01); *G06K 9/6256* (2013.01); *G06N 3/0454* (2013.01); *G06N 20/00* (2019.01)

(58) Field of Classification Search
None
See application file for complete search history.

(56) References Cited

U.S. PATENT DOCUMENTS 10,685,262 B2 *  6/2020  Yao ........................ G06V 10/20
2018/0330194 A1 * 11/2018  Peng ........................ G06N 3/08

OTHER PUBLICATIONS

"A new deep convolutional neural network for fast hyperspectral image classification" by Paoletti et al. (Year: 2017).*

* cited by examiner

*Primary Examiner* — Evren Seven
(74) *Attorney, Agent, or Firm* — Pierce Atwood LLP

(57) ABSTRACT

A system that can create an approximated model from a trained machine learning model (such as a neural network) where the approximated model can operate using fewer computing resources than the original trained model. The system can create the approximated model without the voluminous training data used to create the original trained model. The system can rely on just the data describing the trained model and an indicator as to how closely the approximated model should correspond to the original model and/or the desired savings of computing resources. Various lossless and/or lossy approximations may be performed to obtain multiple approximated models that may be substituted for the trained model during runtime operations to achieve significant speed/cost savings over operation of the original trained model.

20 Claims, 15 Drawing Sheets

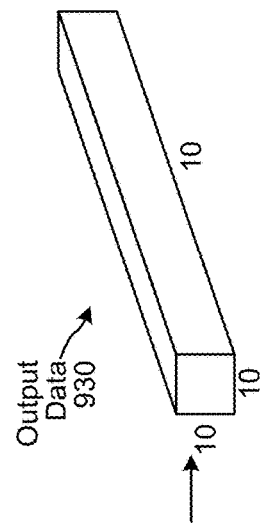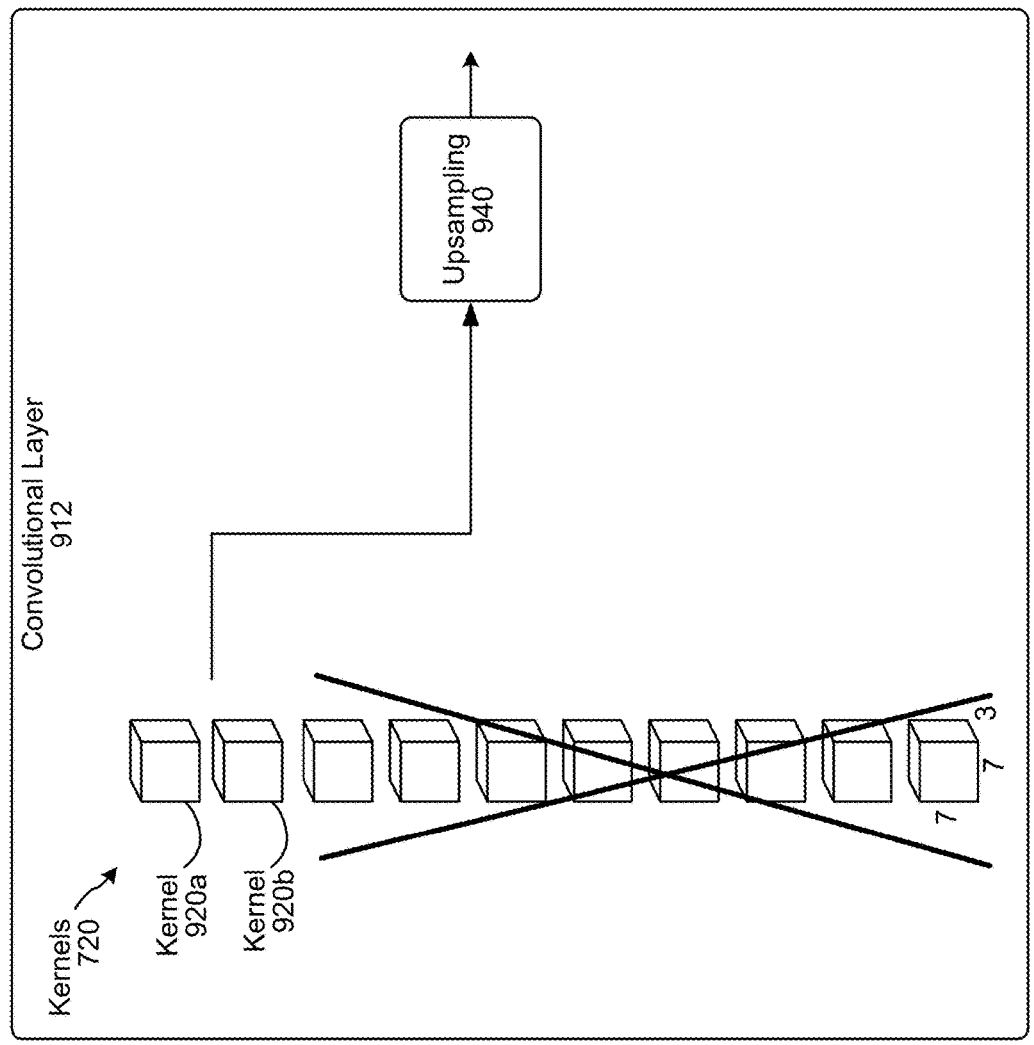
FIG. 9

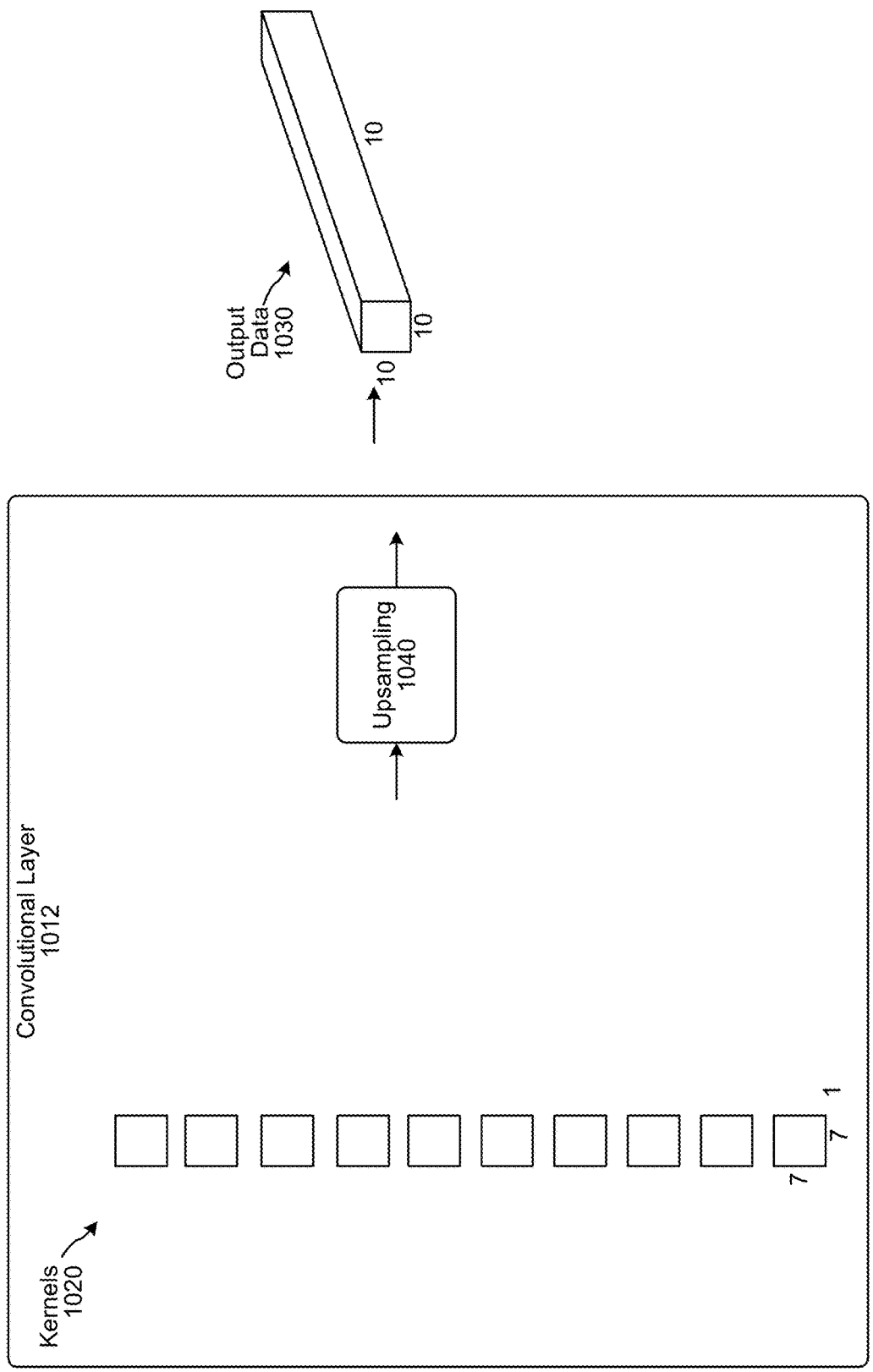

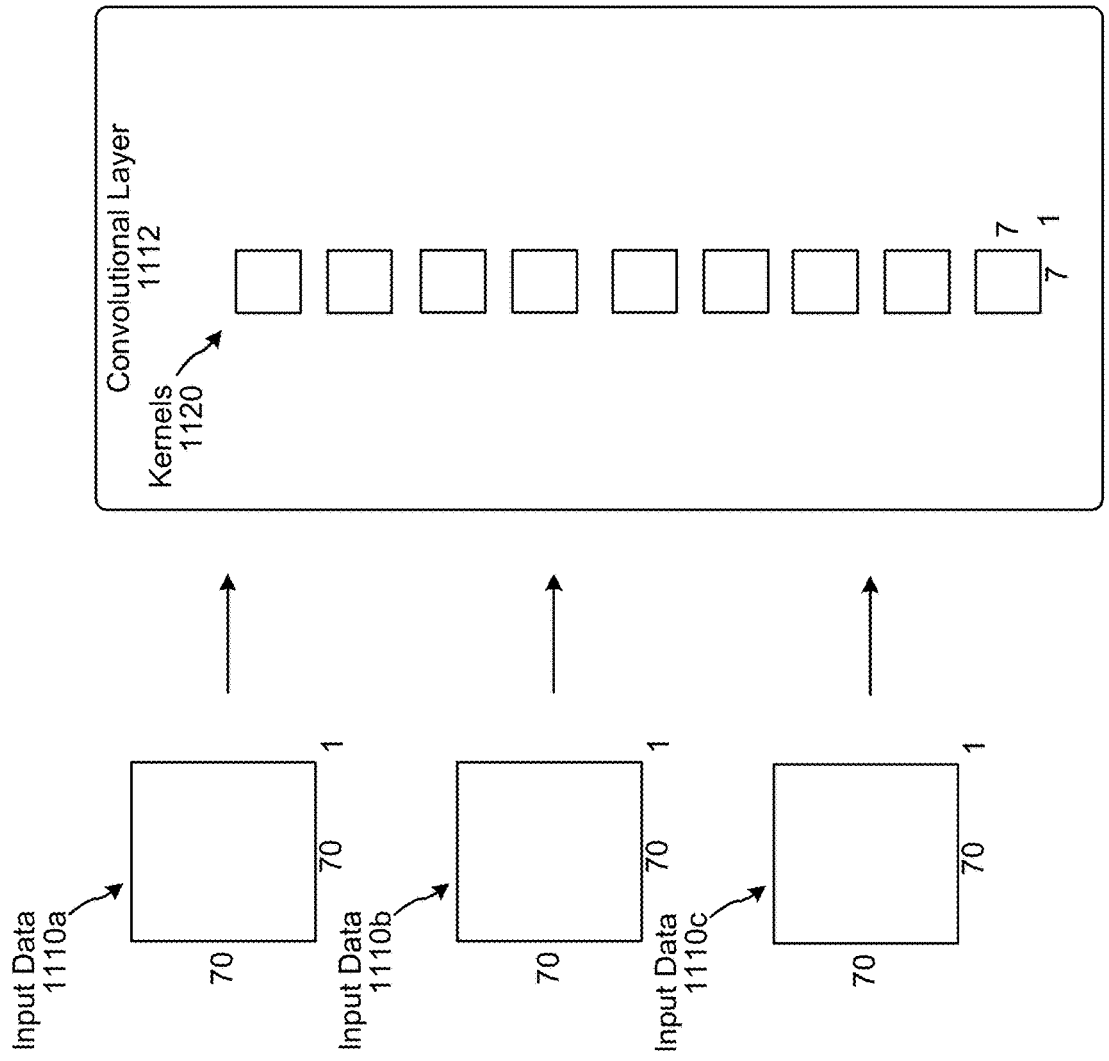

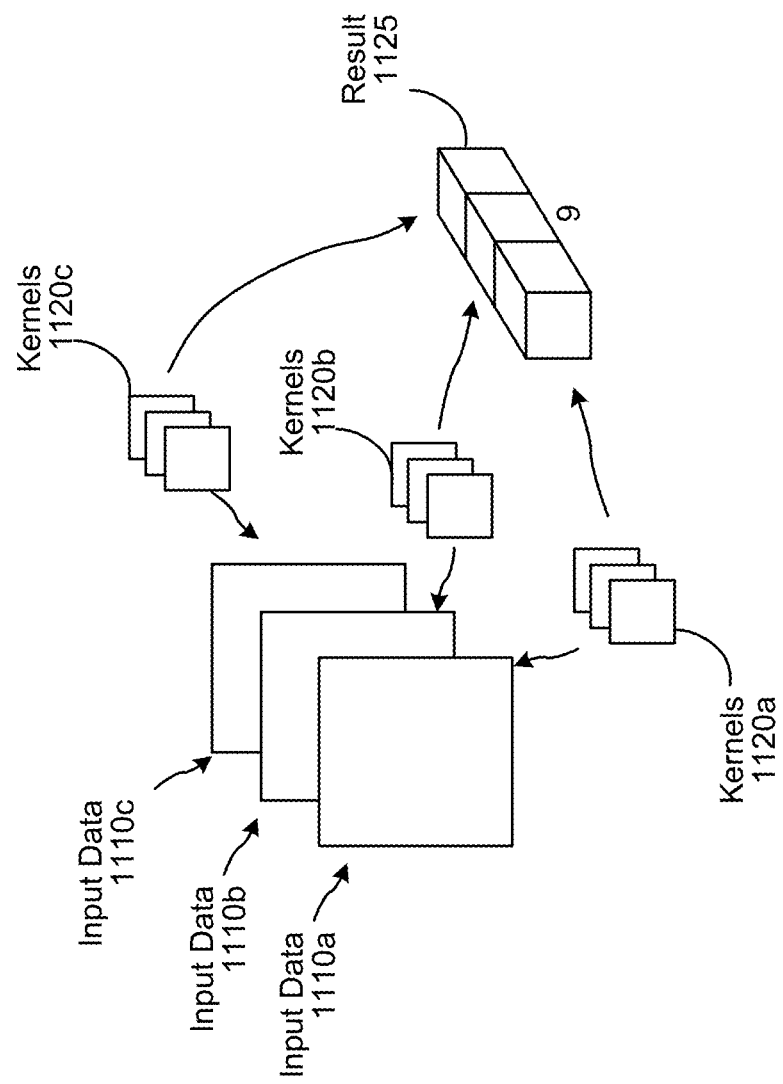

FIG. 13

Approximated Model A

Overall Score: $O_A$
Goodness Score: $G_A$
Speed Score: $S_A$

Approximated Model B

Overall Score: $O_B$
Goodness Score: $G_B$
Speed Score: $S_B$

Approximated Model C

Overall Score: $O_C$
Goodness Score: $G_C$
Speed Score: $S_C$

Approximated Model D

Overall Score: $O_D$
Goodness Score: $G_D$
Speed Score: $S_D$

Approximated Model E

Overall Score: $O_E$
Goodness Score: $G_E$
Speed Score: $S_E$

Approximated Model F

Overall Score: $O_F$
Goodness Score: $G_F$
Speed Score: $S_F$

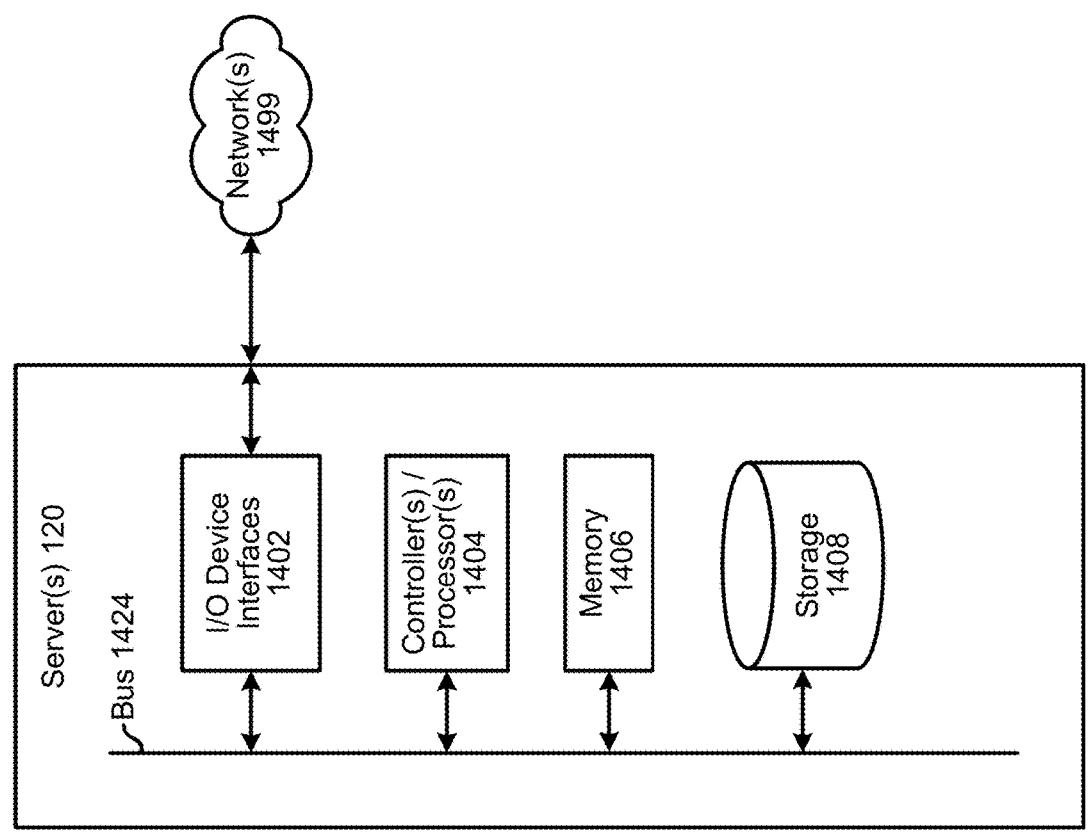

TRAINED MODEL APPROXIMATION

BACKGROUND

Machine learning is a computing technique whereby a computing system can learn how to perform a specific task without explicitly being programmed to do so. Machine learning may be used to handle a number of different tasks of varying complexity. Machine learning computing may rely on trained models that are trained using training data sets. Once trained, a machine learning model may be capable of processing input data and producing output data that conforms to the function for which the model has been trained.

BRIEF DESCRIPTION OF DRAWINGS

For a more complete understanding of the present disclosure, reference is now made to the following description taken in conjunction with the accompanying drawings.

FIG. 9 is a conceptual diagram illustrating removing kernels from a layer of a neural network following a singular value decomposition operation according to embodiments of the present disclosure.

FIG. 10 is a conceptual diagram illustrating removing kernel dimensions from a layer of a neural network following a singular value decomposition operation according to embodiments of the present disclosure.

FIGS. 11A and 11B illustrate dividing dimensions of data for separable processing by dimensions of kernel operations according to embodiments of the present disclosure.

FIG. 13 illustrates an example output of a plurality of approximated models according to embodiments of the present disclosure.

FIG. 14 is a block diagram conceptually illustrating example components of a server according to embodiments of the present disclosure.

DETAILED DESCRIPTION

Figure 1:
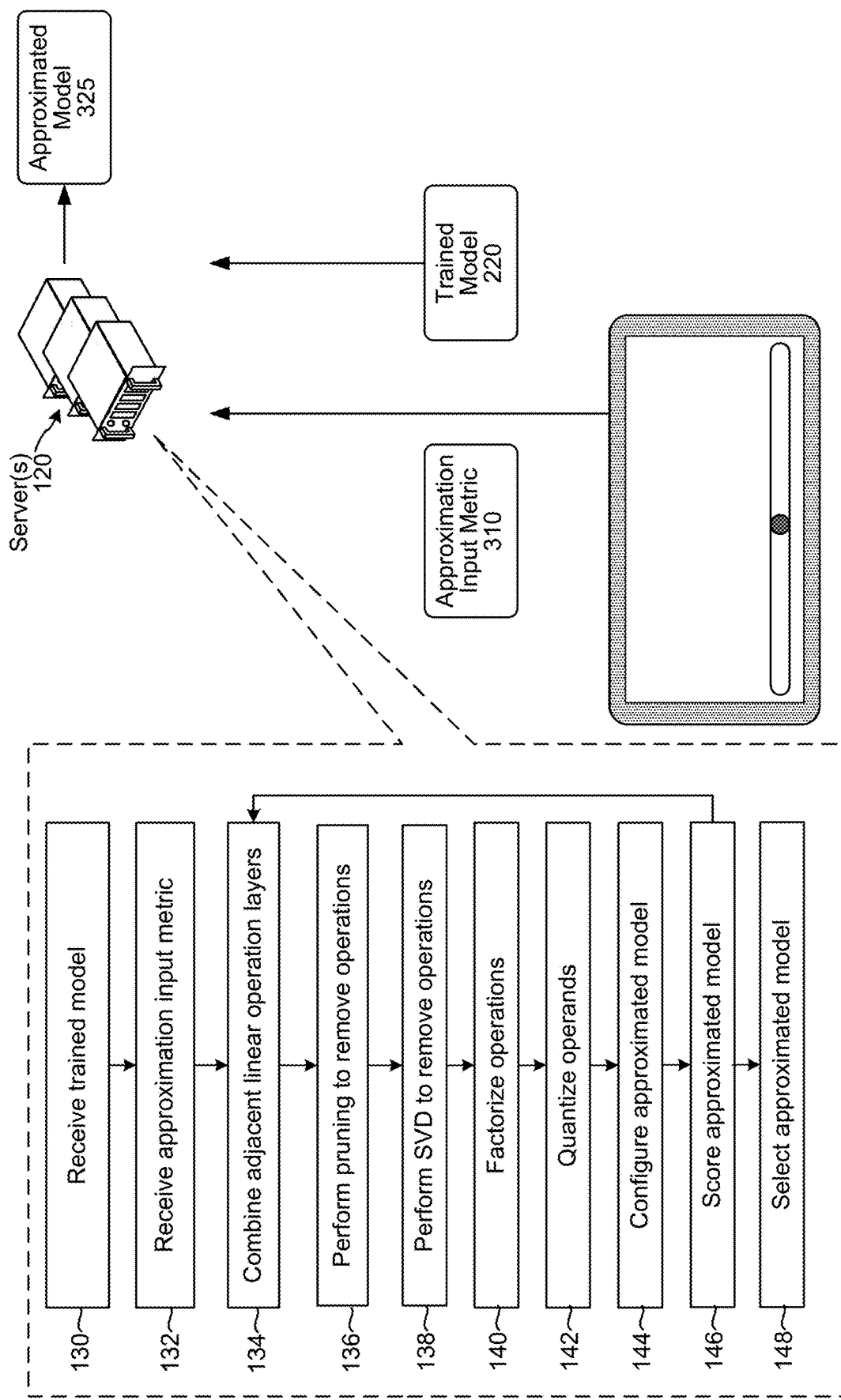
FIG. 1 illustrates a system for approximating a trained model according to embodiments of the present disclosure.

Machine learning (ML) is a valuable computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, predictive analyses, and many more.

Trained models come in a variety of forms including include trained classifiers, Support Vector Machines (SVMs), neural networks (such as deep neural networks (DNNs), recurrent neural networks (RNNs), or convolutional neural networks (CNNs)) and others. As an example, a neural network typically includes an input layer, an output layer and one or more intermediate hidden layers where the input layer is configured to take in a certain kind of data and the output layer is configured to output the desired kind of data to result from the network and the hidden layer(s) perform a variety of functions to go from the input data to the output data.

Various techniques may be used to train ML models including backpropagation, statistical learning, supervised learning, semi-supervised learning, stochastic learning, or other known techniques. In supervised learning a model may be configured to infer a function from labeled training data. Thus a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

Training of a ML model can require a significant amount of computing resources. In particular, as use of larger training data corpuses may result in a more robust and accurate trained model, large training data corpuses (including thousands to millions of training examples) are not uncommon. To process those corpuses and train the corresponding models, model training may take days of computing time, even when using powerful computing systems to train the model.

Further, the trained models themselves can be large in terms of computing storage they occupy and can also be resource intensive in terms of the amount of computing resources (in terms of memory, processing power, processor time, or the like) a computing system may need to operate a trained model to perform its desired function.

Given the computing resources trained models may need to operate, particularly trained models that are operating on large amounts of data, and/or models that are being used to address many different processing requests, trained models are often operated as part of distributed computing systems where one or more servers are configured to operate one or more instantiations of the trained model using input data sent to the server(s) from other computers (such as those connected to the server(s) over the internet or some other network). The server(s) may also be configured to send the results of the trained model's operation (e.g., the output data) to other computers.

As server(s) and remote computing involve complex systems, companies may provide such computing resources for a fee. Those fees may be tied to the amount of computing resources used. Thus operation of complex trained models may incur significant costs. Further, the more complex a trained model the longer it may take to process input data resulting in higher costs and potentially higher latency, which may be undesirable.

One option for reducing the computing cost for operating a trained model is to re-train the model to a form that uses fewer computing resources at runtime. There are drawbacks to this, however. First, a retrained model may be less robust than an initial trained model and may perform with less accurate results at runtime. Second, model retraining often simply involves going through the training process using revised training data (such as new training examples, new training parameters, or the like) and is often as resource intensive as the initial model training process. It is undesirable to go through intensive model retraining when the performance of the resulting new/retrained model may not be reliable. Third, model selection may be manual process requiring designing a smaller network architecture, where it is unknown what that architecture should be.

Offered is a system that addresses these technical problems. The system can take an existing trained model, such as a neural network, and rather than re-training the model, which may involve new training data and extensive computing resources, the system can alter the operations and configuration of the existing model to result in a new model that uses fewer computing resources at runtime. While the new model may be configured to operate on the same type of input data as the initial model, and may be configured to output the same type of output data, its internal operations are modified so that it is more efficient during operation. As a tradeoff, the new model may not perform in the same way as the original model as it approximates the original model rather than duplicating it. Thus the new model may be referred to as an approximated model. Creation of an approximated model using the techniques created herein is significantly faster than training a new model (e.g., minutes of computing time instead of days). The approximated model may be used at runtime instead of the original model during runtime conditions that call for faster processing time.

Further, the system may take as input an indication as to how much of a performance tradeoff a user is willing to absorb in order to achieve reductions in computing resource usage/operating cost by the eventual approximated model. That input may be used by the system to create one or more approximated models. An approximated model may then be deployed and used at runtime as a substitute for the original model. The approximated model may use fewer computing resources than the original model, thus improving processing time, potentially resulting in significant cost savings over use of the original model.

The system may also output multiple approximated models where each approximated model may offer different performance characteristics, such as a different tradeoff between speed and closeness of approximation to the original model. Further, each approximated model created by the system may correspond to one or more scores. One score may correspond to how closely the new approximated model corresponds to the original model (e.g., how closely the new model approximates the operations of the original model). Another score may correspond to the speed gains from the particular approximated model and the original model. Another score may combine both aspects and may represent the tradeoff between speed and approximation. Creation of and/or selection of the approximated model may depend on the input provided, which may thus impact the creation of the approximated model.

Further, multiple approximated models may be created and used at different times when the system actually operating the trained model at runtime determines that a current situation calls for more or less speed, more or less adherence to the original model, or the like. For example, during one runtime period a system may operate the original trained model that uses a first amount of computing resources, during a second period the system may operate a first approximated model that uses a second amount of computing resources that is less than the first, and during a third period the system may operate a second approximated model that uses a third amount of computing resources that is less than the second. As creating an approximated model from a trained model takes significantly fewer computing resources than training a model, creating and using approximated models in this way is an improvement over current multi-model solutions.

Thus, offered is a system that can take an existing neural network and output a new, faster network by trading off speed for accuracy without requiring network re-training or access to the original training data. Trading off a small amount of accuracy for speed will reduce the costs of running neural networks. The model approximation system applies mathematical approximations to any neural network or trained model to generate the new approximated model, where the new approximated model requires a reduced theoretical compute needed for operation during runtime compared to the original model. A user may tune their accuracy tolerance in exchange for speed gains, as their application or external system allows.

FIG. 1 illustrates a system for approximating a trained model according to embodiments of the present disclosure. Although the steps of FIG. 1, and other figures below, are discussed in a particular order, unless expressly stated otherwise the order of operations may be changed and still be within the scope of the present disclosure. As shown, server(s) 120 receive (130) a trained model 220 and receive (132) an approximation input metric. The approximation input metric may be an input from a device (such as a computer as shown) which may include a sliding scale input where a user can select how much a desired approximated model should correspond to the original model versus how much the desired approximated model should provide speed improvements over the original model. The approximation input metric 310 may be received directly from another device or may be calculated by the server(s) 120 using another input value (such as data resulting from a position of the sliding input). Further details of the approximation input metric 310 are provided below in reference to FIGS. 5A-5D.

The server(s) 120 may receive the trained model 220 from some storage or other computing component in communication with server(s) 120. In certain configuration the trained model 220 is stored in storage associated with server(s) 120, and is selected for an approximation procedure, for example by a user providing the approximation input metric 310. The trained model 220 may also be uploaded to server(s) 120 by a user or other computer. The trained model 220 may also be accompanied by metadata or other information describing the trained model 220. The form of the data of the trained model 220 may include data describing the structure of the trained model (e.g., setting out the number of layers of a neural network) as well as data describing the specific operations of the trained model (e.g., setting out the operations performed by each layer and specifying the input data type and output data type of each layer). Other data may also be received with or as part of the trained model 220.

To create an approximated model from the trained model 220, the server(s) 120 may combine (134) adjacent linear operation layers to reduce the number of operations the trained model performs without causing any loss in performance. Such an operation may be performed by a combination component 402 shown in FIG. 4 and discussed below. The server(s) 120 may also perform (136) pruning to remove operations that do not impact the final output of a particular layer or of the trained model as a whole. Using the data describing the trained model 220, the server(s) 120 (for example using a pruning component 404) may identify low value operations and may remove them from the model, thus reducing the amount of computing resources needed to operate the model. Depending on the operations, such pruning may have little to no impact on the results of the model while also providing an improvement in the model's operating cost (in terms of speed, computing resources expended, etc.).

The server(s) 120 may also perform (138) singular value decomposition (SVD), a technique known in the art that creates an ordered list of operations for a particular function to identify its principal components. The server(s) 120 may, for example, perform SVD to identify the principal components of a layer of a neural network. The SVD function factorizes the matrices used to perform the functions of the layer. The server(s) 120 may then remove the least important components of a layer to create fewer operations within the layer. While this removal may impact operation of the model, it will also reduce the amount of computing resources needed to operate the model. SVD may also be performed on specific operations within a component, and/or on other functions to identify potential operations of the trained model that may be removed. SVD operations may be performed by an SVD component 406.

The server(s) 120 may also factorize (140) certain operations to reduce the dimensionality of certain operations and thus result in potential speed improvements during model operation. A factorization component 408 may be used for such operations. The server(s) 120 may also quantize (142) certain operands to reduce the number of bits used for certain operations, particularly when the bits allocated by the original model are not necessary to convert input data for a particular operation to output data for that operation. Such quantization operations may reduce the cost of operation of the model at runtime and may be performed by a quantization component 410.

The approximation steps 134-142 may be performed in different orders and using different values for the approximation (e.g., different values for cutoffs for pruning operations, different thresholds for removing post-SVD determined functions, different values for quantization, etc.). Approximation operations may also be performed using the approximation input metric 310 to guide how aggressively the server(s) 120 perform the approximation operations to result in model operation cost reduction. When one set of approximation operations is completed, the server(s) 120 may configure (144) and score (146) the approximated model. Scoring may be performed by a scoring component 412. The score for a particular approximated model may correspond to how closely the approximated model approximates the original trained model 220. For example, the scoring component 412 may take "goodness" approximations obtained from an SVD operation and combine the scores corresponding to the components that were retained during a particular SVD operation to determine a score for the approximated model. The scoring component 412 may also determine a score for the approximated model that represents the speed improvement of the approximated model over the original trained model 220. For example, the scoring component 412 may estimate the number of floating point operations (flops) needed to operate the original trained model 220 and the number of flops needed to operate the particular approximated model and may create a score representing that difference. The scoring component 412 may also create a score that represents both the speed improvement and the approximation.

The steps 134-146 may then be repeated to create a number of different approximated model. For example, the server(s) 120 may alter the order of steps 134 through 142 to create different approximated models, may alter the aggressiveness of the approximation, etc. to configure a number of approximated models. The configured approximated models may then be scored and those scores used (along with the approximation input metric 310) to select at least one approximated model 325 that may be output by the server(s) 120. The approximated model 325 is configured to input data of the same input data type as the trained model 220. Although the approximated model 325 may now include fewer operations (as well as potentially altered operations) from the original trained model 220, the approximated model 325 is configured to output data of the same output data type as the trained model 220. (For example, if the trained model 220 is configured to input image data and output altered image data, the approximated model 325 is also configured to input the same type of image data and output the same type of altered image data.) Thus, the approximated model 325 may be substituted for the original trained model 220 at runtime to perform a similar function as the trained model 220, though using fewer computing resources (and potentially with some loss of accuracy).

Further details of the operation of the model approximation system are discussed below.

Figure 2:
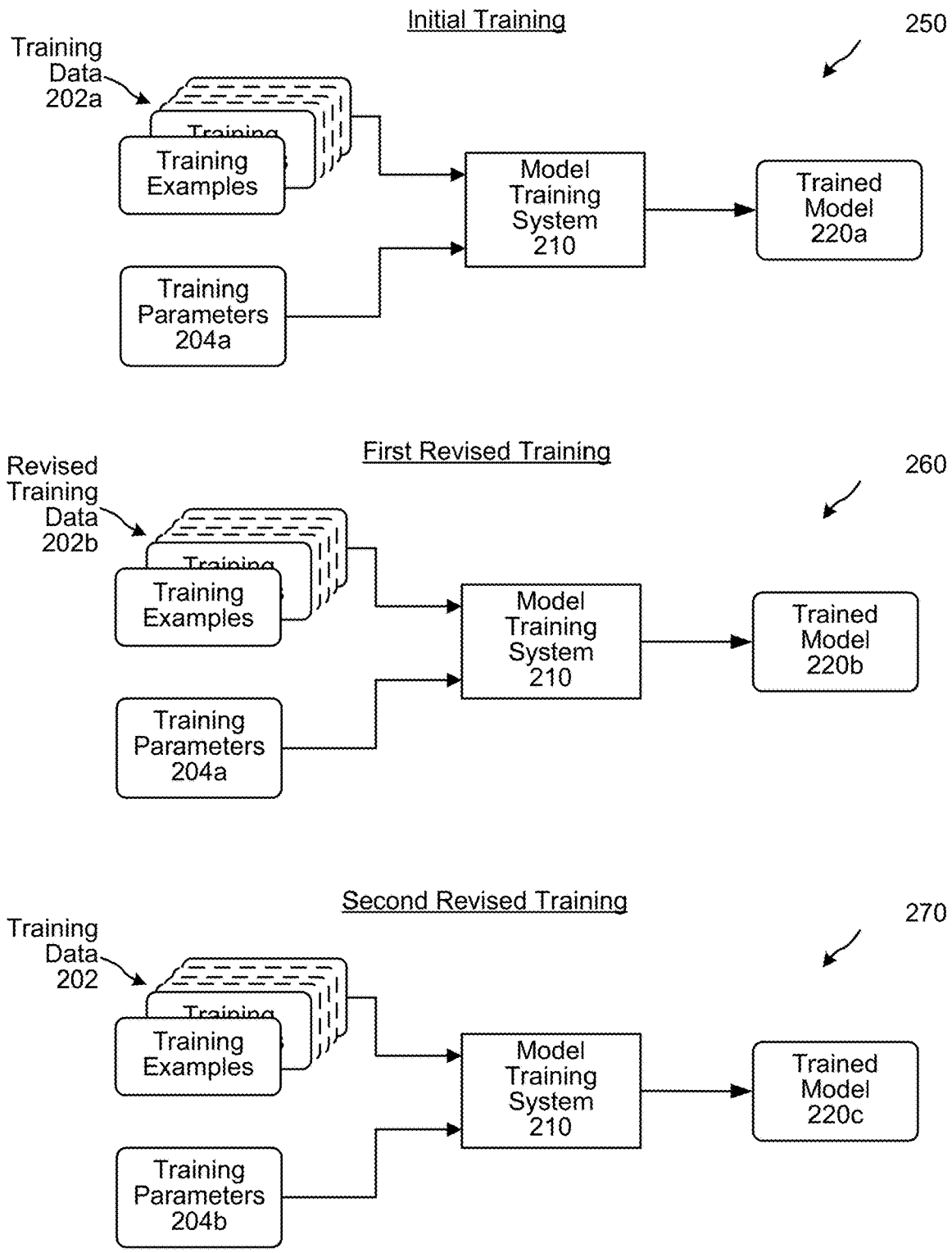
FIG. 2 is a conceptual diagram illustrating retraining of a machine learning model according to the prior art.

FIG. 2 is a conceptual diagram illustrating retraining of a machine learning model according to the prior art. Process 250 illustrates an initial model training where first training examples 202a and first training parameters 204a are input into a model training system 210 to output a first trained model 220a. Previously, if the first trained model 220a had too high of an operational cost at runtime (e.g., used too many computing resources, took too long to operate, etc.), the model would need to be retrained. Retraining could either take the form of doing a revised training using different training examples (as shown in process 260 where second training examples 202b are used to create second trained model 220b), or using different training parameters (as shown in process 270 where new training parameters 204b are used to create third trained model 220c), or some combination thereof. Each training process, however, was itself costly in terms of computing resources, and could take several days of server time to complete, with no guarantee of how well a new model may ultimately perform. In situations where some accuracy of model performance may be given up in exchange for gains in speed, the retraining process is undesirable.

Figure 3:
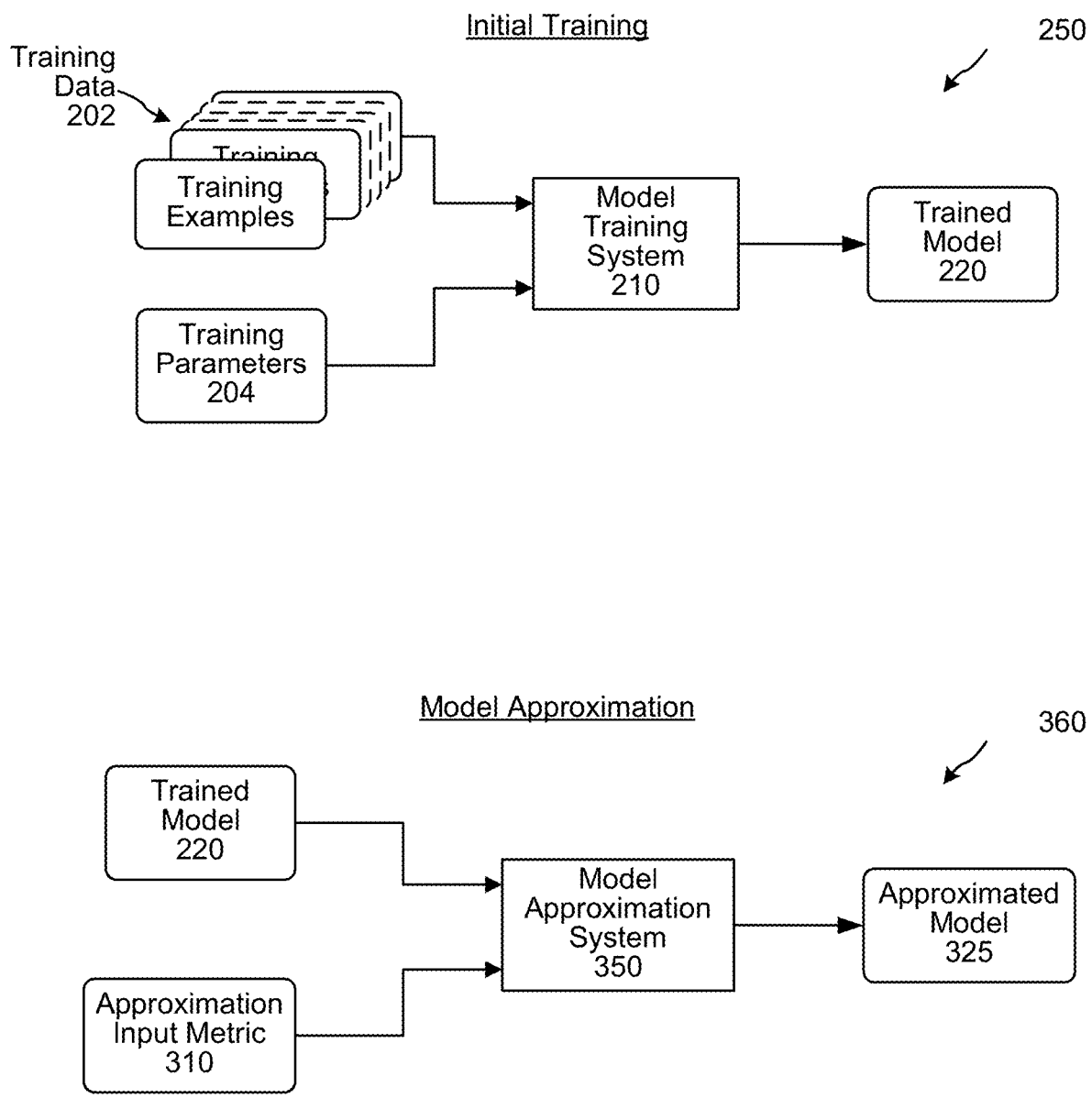
FIG. 3 is a conceptual diagram illustrating approximating a trained model according to embodiments of the present disclosure.
Figure 4:
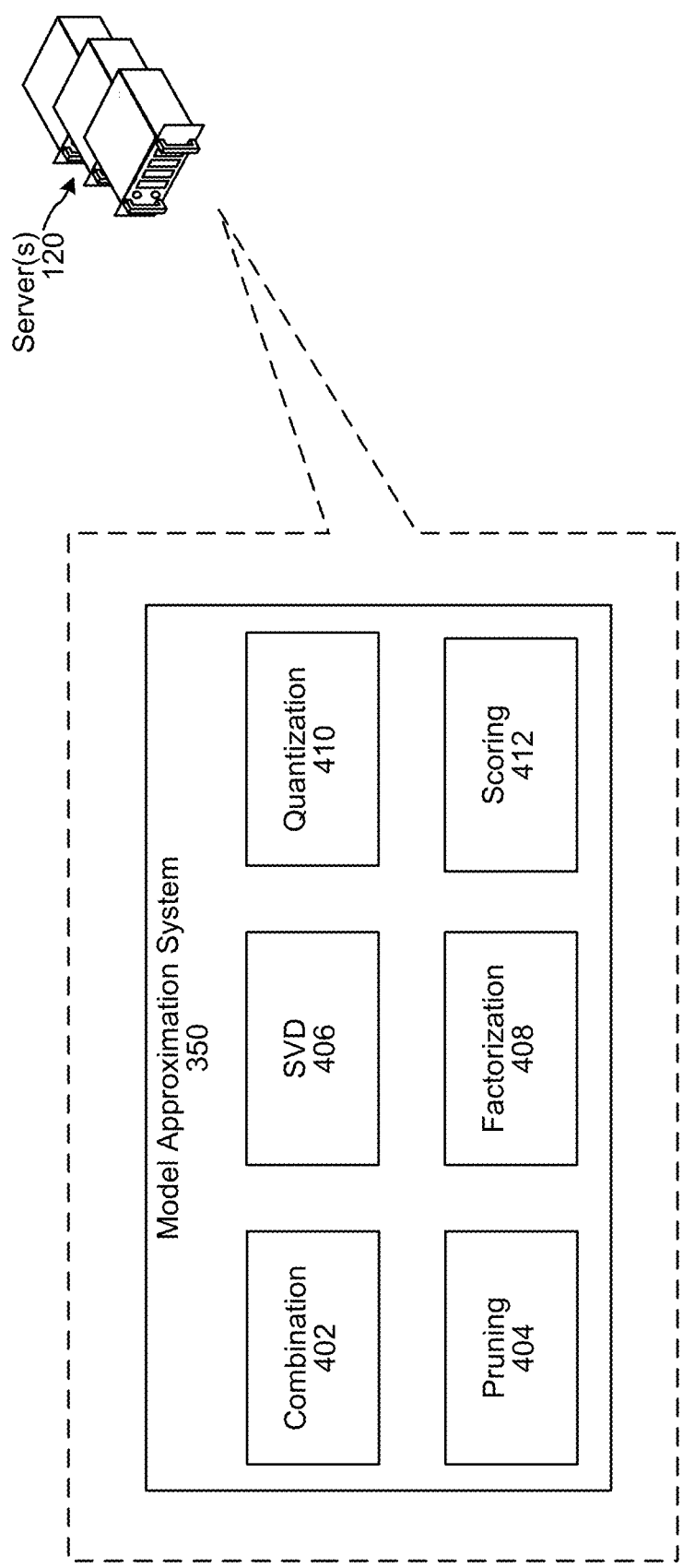
FIG. 4 is a conceptual diagram illustrating components for approximating a trained model according to embodiments of the present disclosure.

The present system improves on this process as illustrated in FIG. 3. FIG. 3 is a conceptual diagram illustrating approximating a trained model according to embodiments of the present disclosure. As shown in FIG. 3, following an initial training operation 250, the system may perform an approximation process 360. During the approximation process 360 data for the trained model 220 may be input into the model approximation system 350 (which may reside with server(s) 120). An approximation input metric 310 may also be input to the model approximation system 350. As shown in FIG. 4, the model approximation system 350 may include a number of components such as combination component 402, pruning component XR04, SVD component 406, factorization component 408, quantization component 410, scoring component 412, and potentially other components as well. The model approximation system 350 may perform the operations of FIG. 1 to configure, score, and select one or more approximated models 325 that can be used during runtime operations instead of the original trained model 220. The creation of an approximated model according to the approximation process 360 is significantly faster than the training process of 250 (or 260/270).

Further, the approximation process 360 may use as input the trained model 220 and its metadata, the approximation input metric 310 and potentially some information regarding the types of data used by the trained model 220 (e.g., data size, format, etc.). The approximation process 360 does not need the training data 202 or training parameters 204 to create an approximated model. Thus, if the trained model 220 was trained using training examples 202 that included sensitive information (such as confidential information, health information, trade secret information, security information or the like), such sensitive information may remain protected and is not exposed to the model approximation system 350. Thus the model approximation system 350 may be run using trained models 220 that may be configured to perform operations on sensitive data, without exposing the sensitive data. This is because the data for the trained model 220 includes information regarding the structure and operations of the model but does not include the sensitive data used to train the model.

Figure 5A:
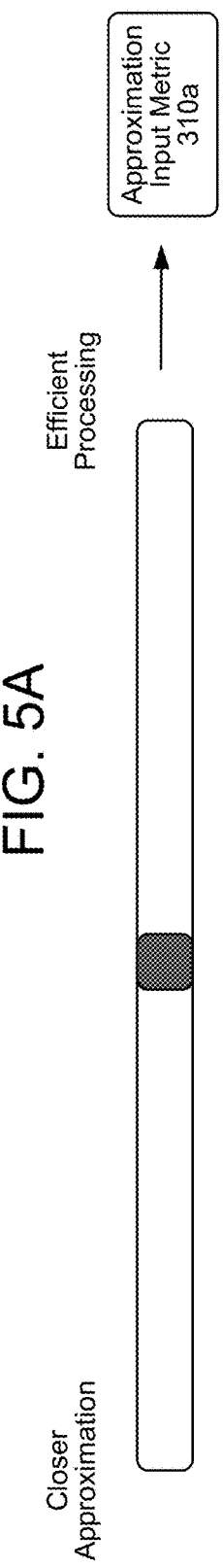
FIGS. 5A-5D illustrated portions of a user interface for obtaining information about a desired level of model approximation according to embodiments of the present disclosure.
Figure 5B:
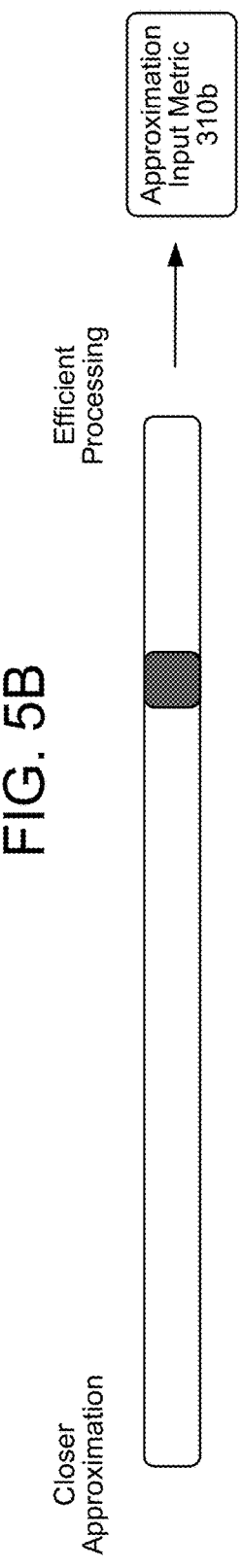
Figure 5C:
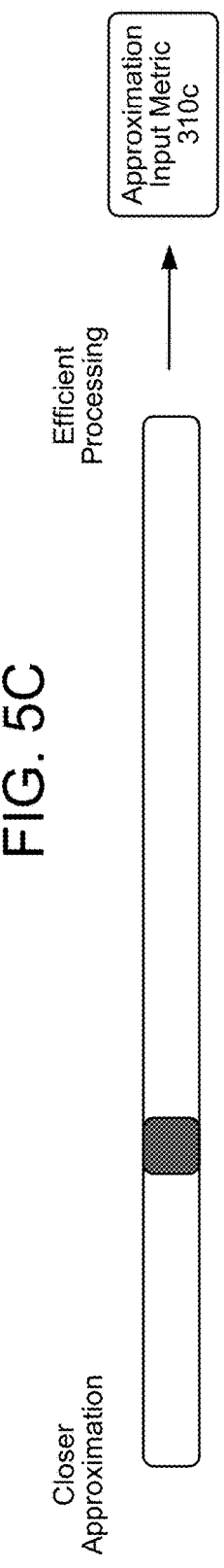

As noted above, the approximation process 360/model approximation system 350 may use an approximation input metric 310. To obtain the approximation input metric 310, the system may receive an input corresponding to a desired reduction of computing resources for an approximated model. For example, the system may provide a user interface that allows a user to operate a slider or other input mechanism to indicate, for example, how the user wishes the output approximated model to be configured relative to the tradeoff between faster processing and closer approximation to the original model. An example of such a user interface is shown in FIGS. 5A-5D. As shown in FIG. 5A, a user interface may present an input, shown as a slider, where a user can slide a user interface element between two sides, one representing closer approximation (meaning the approximated model should stay as close as possible to the trained model) and one side representing efficient processing (meaning the approximated model should provide a good as possible operating speed improvement or other cost reduction as compared to the trained model). Other label can be given to the slider. The user interface may output data corresponding to the placement of the user interface element on the slider and may send that data to the server(s) 120.

In one embodiment that output data may simply be a numerical value (for example a value from 0-1 representing the slider position). That value may function as the approximation input metric 310, or the server(s) 120 may create an approximation input metric 310 using the output data from the user interface. Thus, for example, according to the slide configuration of FIG. 5A, the approximation input metric 310a may represent a value of approximate 0.5, while the slide configuration of FIG. 5B, the approximation input metric 310b may represent a value of approximate 0.75 and the slide configuration of FIG. 5C, the approximation input metric 310c may represent a value of approximate 0.25. Other data values or scales may also be used.

Figure 5D:
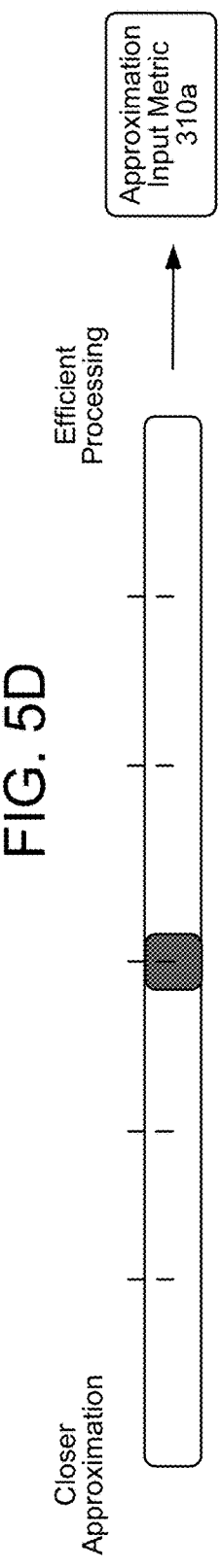

The user interface may also include demarcations noting preset positions on the slider, such as shown in FIG. 5D. The demarcations may correspond to equal divisions on the slider (e.g., every $⅙^{th}$ of the slider). The demarcations may also correspond to pre-set parameters or configurations of the model approximation system 350 for purposes of establishing approximation thresholds or other values that may be used during approximation operations.

The trained model 220 may be sent to the model approximation system 350 as a result of a selection by a user of the trained model (for example using the same user interface that provides the slider of FIGS. 5A-5D). A user may select a model for operation by the model approximation system 350. The trained model 220 may be uploaded to the server(s) 120 or the server(s) 120 may obtain the trained model 220 from some storage accessible to the server(s) 120.

The approximation input metric 310 and trained model 220 may then be used by the model approximation system 350 to perform approximation functions. The approximation functions may fall into two categories, lossless and lossy. Lossless approximations are modifications to the original trained model that do not impact the operation of the model. Lossy approximations are modifications to the original trained model that do impact the operation of the model, potentially making the model perform in a less accurate manner. As illustrated herein, the lossless approximations include linear combination and pruning (depending on the aggressiveness of the pruning), and the lossless approximations may include pruning (depending on the aggressiveness of the pruning), SVD, factorization and quantization. Other techniques may also be used. The system may perform lossless operations before lossy operations or the system may perform the operations in a different order. The approximation functions (such as steps 134-142 from FIG. 1) are explained in further detail below.

For illustration purposes, the approximation functions are described with respect to a neural network, and in particular with regard to a convolutional neural network (CNN). A CNN is a form of a trained model that has multiple layers and is often used in computer vision and other image processing techniques. A CNN for image processing is used herein for illustrative purposes only as the techniques described herein may be used with various trained models depending on the model configuration.

Figure 6:
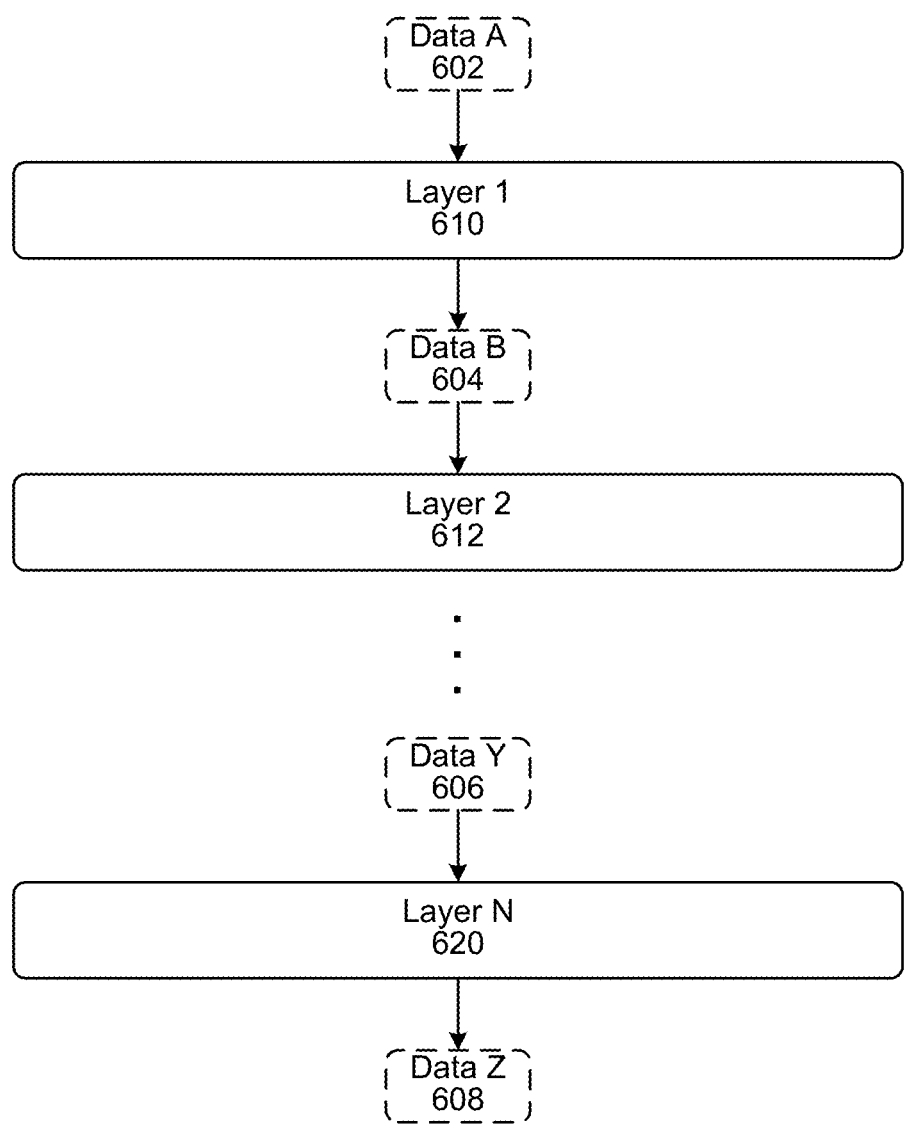
FIG. 6 is a conceptual diagram illustrating layers of a trained model according to embodiments of the present disclosure.

As illustrated in FIG. 6, a neural network may include a number of layers, from input layer 1 610 through output layer N 620. Each layer is configured to output a particular type of data and output another type of data. The neural network illustrated in FIG. 6 is configured to input data of type data A 602 (which is the input to layer 1 610) and output data of type data Z 608 (which is the output from the last layer N 620). The output from one layer is then taken as the input to the next layer. For example, the output data (data B 604) from layer 1 610 is the input data for layer 2 612 and so forth such that the input to layer N 620 is data Y 606 output from the penultimate layer (not shown).

While values for the input data/output data of a particular layer are not known until a neural network is actually operating during runtime, the data describing the neural network (such as the data available for trained model 220) describes the structure and operations of the layers of the neural network. Thus the model approximation system 350 may analyze the data for trained model 220 to determine what operations are performed by each layer, what layer's output goes to what layer's input, how many computing resources (such as number of instructions, memory usage, processor cycles, flops, etc.) are needed to perform particular operations, what form the data may take as it is passed from layer to layer, and other information about the trained model 220. Data type/data form may include characteristics such as domain, format, dimensionality, length, value ranges, etc. Using the data of the trained model 220 the model approximation system 350 may be able to determine how fast a given layer or operation may take to compute on a particular set of hardware.

One approximation the system may perform is combining adjacent linear operations. Using the data that describes the trained model 220 the combination component 402 may determine when two linear operations are adjacent to each other in the trained model. That is, when the output of one linear operation is used as the input to another linear operation without a non-linearity between them. For example, a convolutional layer followed by a batch-normalization or scale layer. The combination component 402 may then combine those two linear operations such that they are replaced by a single linear operation that combines the functionality of the two. For example, if layer 1 610 performs a linear operation of multiplying its input by a factor of $W_1$ and layer 2 612 performs a linear operation of multiplying its input (which is the output of layer 1 610, namely data B 604) by a factor $W_2$ the combination component 402 may replace those two layers of the original model with a single layer in the approximated model (or at least the next step of the approximation process) that has a function of multiplying its input by W' where $W'=W_1 W_2$. Performing this combination will result in a lower flop count for the approximated network, thus improving the overall network processing speed.

In an example of linear combination, for particular neural networks (such as convolutional neural networks used for image processing) the system may remove BatchNorm and Scale layers and modify preceding convolution to absorb the BatchNorm and Scale parameters to produce the same network output without sacrificing accuracy.

A unit in a neural network architecture may be a combination of a few different types of layers: Convolution→BatchNorm→Scale→Non-linearity (ReLU). At training time, the BatchNorm and Scale layers are used to normalize the output of the convolution by learning the population statistics of the output of the convolutional layer, and often have different learning rates and parameters than the Convolutional layers. However, during runtime, no learning is happening on the BatchNorm and Scale layers, and because they are linear operations, the parameters can be merged into the convolution parameters from previous layers to produce identical output before input to a non-linear operation.

For example, a convolution layer's operation may be defined by y=Wx+b where y is the output, is the input, W is the weight factor and b is the bias vector (per-channel). A BatchNorm operation may be defined by $$y = \frac{x - \mu}{\sqrt{\sigma^2}}$$

where y is the output, x is the input, µ is the learned population mean (per-channel) and $\sigma^2$ is the learned population variance (per-channel). A Scale operation may be defined as y=αx+β where y is the output, x is the input, and α and β are learned constants (per-channel). Thus, if a three layer arrangement includes a convolution layer followed by a BatchNorm layer followed by a Scale layer, the input to the entire arrangement (i.e., the input to the convolutional layer) is x, the output of the convolution layer/input to the BatchNorm layer is Wx+b, the output of the BatchNorm layer/input to the Scale layer is $$\frac{Wx + b - \mu}{\sqrt{\sigma^2}},$$

and the output from the Scale layer is $$\alpha \cdot \frac{Wx + b - \mu}{\sqrt{\sigma^2}} + \beta.$$

Thus, the three layer arrangement may be replaced with a single convolution layer (defined by y=W'x+b') where the parameters for the new convolution layer are $$W' = \frac{W}{\sqrt{\sigma^2}}$$

and $$b' = \alpha \cdot \frac{b - \mu}{\sqrt{\sigma^2}} + \beta.$$

This combination technique may be applied to a trained model to combine layers and increase the runtime speed of the trained model.

The combination component 402 may combine other operations whose combination may result in a decreased flop count of the trained model. For example, when a 1×1 convolution is followed by a k×k convolution with a smaller number of output filters, the combination component 402 may combine the convolutions and reduce the flop count. In another example, for a certain layer the combination component 402 may determine a set of filters that compute correlated output and may replace these filters with a single filter.

Another approximation the system may perform is pruning of certain operations. The model approximation system 350 may determine, for example, where values of certain operations are close to zero or where sections of data are computed, but then never used. In such situations, the pruning component 404 may remove such operations from the trained model so they are not included in the approximated model, thus reducing the number of operations performed by the approximated model 325 and increasing the approximated model's operational speed versus the original trained model 220. One example of an operation that might be pruned is when there is a set of 1×1 convolutions with a stride greater than 1 that then downsample input data, discarding half of the input. The pruning component 404 may remove operations that calculate data that is to be discarded.

Another example of an operation that may be pruned is a situation where input data is reused in multiple computations, such as an image kernel size being greater than the stride. Operations that calculate duplicative or redundant data may be removed, and the relevant model portions restructured to rely on the previously calculated data rather than calculating it again.

Another example of part of the trained model that may be pruned is a layer that is not contributing to the final output but using memory allocations, such as crop layers that trim data but where the same trimming can be achieved at the input to the network, to save computation throughout.

The system may also use the domain and range of each computed filter to find filters that are not discriminative, and prune those convolutions, especially if they appear before a nonlinearity.

Operations by the pruning component 404 may be lossless or lossy. Lossy pruning operations may impact later layers of the trained model. The system may be more aggressive in pruning activities in order to create approximated models that have lower flop counts and can be operated more quickly. The system may also select its aggressiveness with pruning based on the approximation input metric 310. If the metric 310 indicate a greater preference for speed, the system may engage in more aggressive pruning. For example, the pruning component 404 may remove kernel operations that are close to zero to save flops. In particular the computing component may prune entire layers, may prune only certain kernels of the layer, and/or may prune portions of a kernel. As the system can determine the network topology of the trained model 220 from its structure and functionality data, the system can determine how much of an impact to later layers removing a certain layer/kernel will be. Thus, how close to zero the operations may be before they are pruned may depend on the approximation input metric 310 and the potential later-layer impact of a particular operation that may be pruned. The system may thus determine a pruning threshold based at least in part on the approximation input metric 310.

The system may apply a score to a particular layer, kernel or kernel portion (operation or operation portion) based on how heavily later operations rely on that particular layer, operation or operation portion. The score may reflect the importance of that layer/operation/operation portion to the entire model. If the score is below the determined threshold, the system may remove that layer/operation/operation portion and not include it in the approximated model 325.

Figure 7:
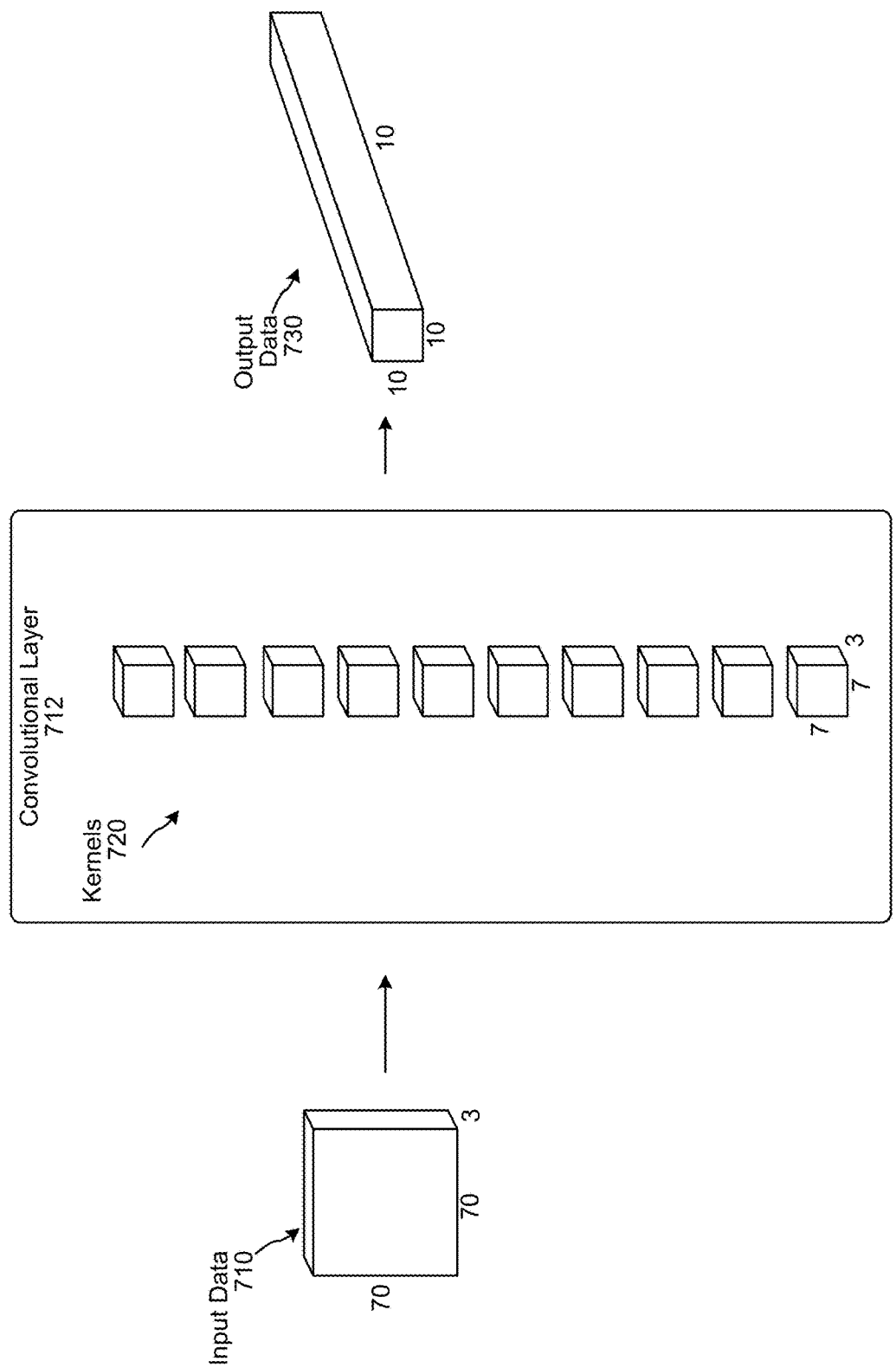
FIG. 7 is a conceptual diagram illustrating a layer of a neural network according to embodiments of the present disclosure.

To further detail operations of the model approximation system, an example of a CNN is used. In an example CNN, a layer may include a convolutional layer that is configured to apply a series of kernels/filters to incoming image data. The kernels may include a group of weights/functions to be applied to input image data. For example, a kernel may include a matrix multiplication or other operation that processes input data (e.g., an input matrix) to determine output data (e.g., an output matrix). An example convolutional layer is shown in FIG. 7. As shown, input data 710, having dimensionality of 70×70×3 where 70×70 may represent the size of an image portion being processed and the 3 may represent three different channels of an image (for example red, green and blue (RGB)). The convolutional layer 712 is a 4D tensor, meaning it includes a plurality of 3D kernels 720. Each kernel is illustrated as being a 7×7×3 kernel. Thus, each input data processed by the layer 712 result in output data 730 of a single vector having dimensionality of ten of the kernels convolved together. In the present example, the stride of the filters is 7, resulting in a the output data of dimensionality as shown in output data 730. The operations of layer 712 may be applied across a variety of different sections of an image, resulting in many different output vectors. The next layer of the CNN (not shown) is therefore configured to input data of the type produced by layer 712, that is data of the form of output data 730

Note that the example of the form of the input data, output data, content of the layer, etc. is described for illustration purposes only and that the present system may apply to many different kinds of trained models, data types, dimensionality, layer functions, or the like.

Figure 8:
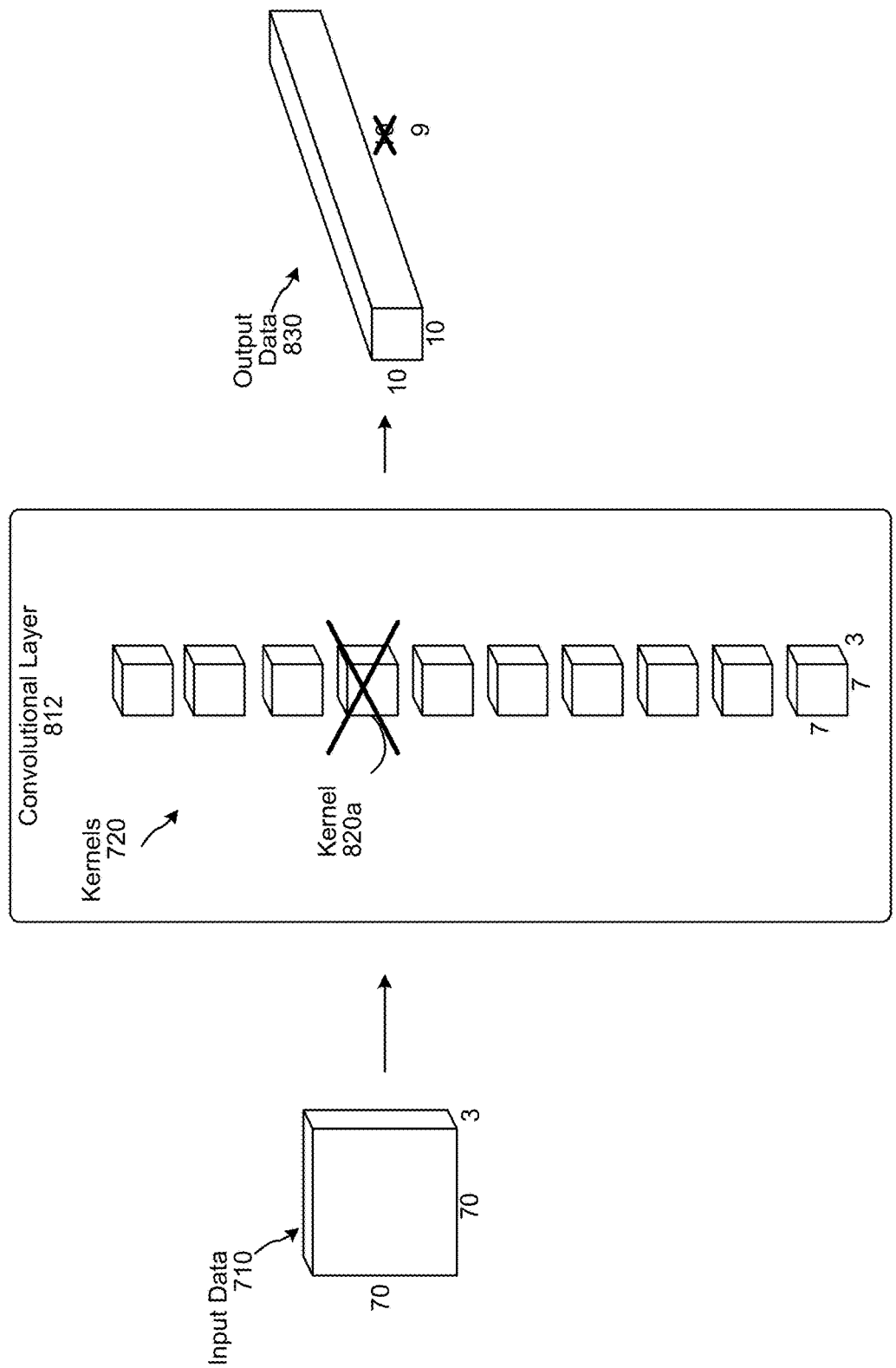
FIG. 8 is a conceptual diagram illustrating removing a kernel from a layer of a neural network according to embodiments of the present disclosure.

Turning to FIG. 8, if a particular kernel of the layer 812 is determined to lack sufficient impact on the model overall, the system may prune that kernel (for example kernel 820a) and remove the operations of that kernel from the trained model 220 when determining the approximated model 325. Removal of that kernel may result in a different dimensionality for output data 830 than for output data 730, as shown. That dimensionality change may impact subsequent layers, thus carrying through flop savings to later layers, at a potential impact to accuracy of the overall model.

For example, a typical convolutional layer W has $c_o$ output filters, and each filter is of size ($c_i$, k, k), where $c_i$ is the number of input channels (i.e., the number of channels of the input blob), and k is the kernel size. To determine a convolutional filter candidate for pruning, an output filter is assigned a score $S_{c_o}$. If all the parameters of a convolutional filter are close to zero, that filter outputs a result close to zero for all possible inputs. Therefore, this filter is not providing useful information to downstream computations and the entire filter can be removed.

The score $S_{c_o}$ for a convolutional filter may be calculated as the maximum absolute value of a given weight in the filter, normalized by the size of the filter:

$$S_{c_o} = \frac{1}{c_i k^2} (\max_{a \in c_i, b \in k, c \in k} |W_{c_o abc}|) \quad (1)$$

where $c_o$ represents the number of kernels, a is an index across the number of input channels $c_i$, b is an index across one kernel dimension k, and c is an index across the other kernel dimension k.

Such a normalized score allows comparison of scores across filters of the trained model. This allows you a single threshold to be set for the entire network, and any convolutional filter with a metric value below the threshold (using the above score calculation) is pruned. The threshold may be determined experimentally for a specific network, or may be set in any number of other ways, for example using the approximation input metric 310. This allows the system to assign an important to a particular filter based on its weight. If the weight is above the threshold the filter may be considered important and included in the approximated model. If the weight is below the threshold the filter may be considered not important and removed (i.e., not included) in the approximated model.

When a convolutional filter is removed from a network layer, the output size of that layer is decreased by 1, and that filter input is no longer available for downstream convolutions to use. To remove a single convolutional filter, the filter needs to be removed in addition to the weights of the next convolutional layer(s) using that input. Removing a single convolutional filter decreases the number of flops in at least two layers—the convolutional layer who had the filter removed and the next layer that uses that layer's output.

For example, for a convolution of kernel size $k_A$, stride size $S_A$, input channels $A_i$, output channels $A_o$, input height h and input width w, the original flop count of the convolution layer may be expressed as:

$$\frac{hwA_iA_ok_A^2}{s_A^2} \quad (2)$$

The flop count for the new convolutional layer after removing a single convolutional filter may be expressed as:

$$\frac{hwA_i(A_o-1)k_A^2}{s_A^2} \quad (3)$$

For the next convolutional layer that takes the altered convolutional layer's output as input, its original flop count may be expressed as:

$$\frac{hwA_oB_ok_B^2}{s_A^2s_B^2} \quad (4)$$

where for that next convolutional layer kernel size is $k_B$, stride size is $s_B$, input channels is $A_o$, output channels is $B_o$, input height is $h/s_A$, and input width is $w/s_A$. Thus the flop count for that next convolutional layer after removing the single convolution filter in the previous layer may be expressed (just for two layers) as:

$$\frac{hwA_ik_A^2}{s_A^2} + \frac{hwB_ok_B^2}{s_A^2s_B^2} \quad (5)$$

As can be appreciated, for large numbers of output channels or large kernels/filters, the flop reductions and speed improvements may be significant. Deconvolution may also be removed from a trained model when creating the approximated model. Often, deconvolutional layers appear at the end of the network. Deconvolutions are like convolutions on an upsampled input (e.g., the stride parameter S is in the numerator of the flop count calculation instead of the denominator), and often the input channels to a deconvolution are redundant. A deconvolutional input can be removed the same way as a convolutional filter (particularly if all weights using that input channel are close to zero). However, removing the need for this input filter means the previous convolutional layer can also have that output filter removed. Removing an input to a deconvolutional layer decreases the flops for at least two layers—the convolutional layer before the deconvolution and the deconvolutional layer.

Take the example of a deconvolutional layer following a convolutional layer. If a filter is removed from the convolutional layer, the flop count reduction is as noted above. For the deconvolutional layer its original flop count may be expressed as:

$$\frac{hws_B^2A_oB_ok_B^2}{s_A^2} \quad (6)$$

where for that deconvolutional layer kernel size is $k_B$, stride size is $s_B$, input channels is $A_o$, output channels is $B_o$, input height is $h/S_A$, and input width is $w/S_A$. Thus the flop count for that deconvolutional layer after removing the single convolution filter in the previous layer may be expressed as:

$$\frac{hws_B^2(A_o-1)B_ok_B^2}{s_A^2} \quad (7)$$

yielding a total flop reduction between the altered convolutional layer and the subsequent deconvolution layer of:

$$\frac{hwA_ik_A^2}{s_A^2} + \frac{hws_B^2B_ok_B^2}{s_A^2} \quad (8)$$

As deconvolutional layers may have high flop counts (and may be expensive to compute), such a pruning may yield speed improvements.

When removing convolutional (or deconvolutional) filters in a network, it may be desirable to remove them jointly with other layers that rely on the input. One example is in a residual network, where the outputs of two convolutional layers are added together, so their output sizes must be the same. Further, the output channels should align. For example, a residual unit does an element-wise addition (X+WX) of an input X to the output after X is convolved with W, X and WX must have the same number of output channels. It is thus desirable for the $i^{th}$ output channel of X to have the same "meaning" as the $i^{th}$ output channel of WX. So if filter j in W is slated for removal, the $j^{th}$ filter from any outputs before X should also be removed. To take the joint convolutions into account, the system may calculate the effectiveness metric jointly on convolutions that share outputs that will eventually be added together in the network, and if slated for removal, are all jointly removed to preserve interpretability.

To select certain operations (e.g., kernels of a CNN) for removal, the system may operate the SVD component 406 to perform one or more singular value decomposition (SVD) operations to select operations for removal. SVD is a known operation that separates an operation into a ranked list of the operation's constituent parameters (called principal components) that combine to make up the operation. In particular, a SVD operation separates an operation (e.g., an m×n real or complex matrix M) into the product of three matrices UΣV* where U is an m×m unitary matrix, Σ is an m×n rectangular diagonal matrix with non-negative real numbers on the diagonal, and V is an n×n unitary matrix (and V* is the conjugate transpose of V). The diagonal entries $\sigma_i$ of Σ are known as the singular values of M. The columns of U are called the left-singular vectors of M and are a set of orthonormal vectors of MM*. The columns of V are called the right-singular vectors of M and are a set of orthonormal vectors of M*M. The non-zero singular values of M (found on the diagonal entries of Σ) are the square roots of the non-zero eigenvalues of both M*M and MM*.

Using known techniques the SVD operation may result in a ranked list that includes a list of the principal components along with a cumulative score corresponding to each component as to how well that component, and the components above it on the list, approximate the original operation. The component that most closely approximates the original operation is at the top of the ranked list, followed by the component that next most closely approximates the original operation, and so on. Thus, the ranked list following a SVD operation may be a list in the form of, for example:

| Component | Cumulative Score |
| --- | --- |
| Component-1 | 50% |
| Component-2 | 61% |
| Component-3 | 67% |
| ... | |
| Component-N | 100% |

Thus, the top component of an original operation approximates the original operation with a score of 50%, but the top two components of the original operation together would approximate the original function by a score of 61%. These approximation scores may be used to provide a score for an approximated model 325.

Turning back to the example convolution layer 712 of FIG. 7, an SVD operation may be performed on the kernels 720 of the overall convolutional layer 712. The result may be an ordered list of kernels along with the cumulative operational score. For example:

| Kernel | Cumulative Score |
| --- | --- |
| Kernel-1 | 50% |
| Kernel-2 | 61% |
| Kernel-3 | 67% |
| ... | |
| Kernel-10 | 100% |

Given the system's approximation considerations (such as the value of the approximation input metric 310), the system may select a subset of the ordered list for kernels to include in the approximated model, while determining to remove the others for flop/speed considerations. For example, as shown in FIG. 9, the system may determine to keep kernels 920a and 920b and remove the others.

The approximation score determined by the SVD operation may also be used to determine how many operations to keep. For example, if an approximation input metric 310 indicated a desired approximation of ~70%, the system may select to keep the number of components of an operation that most closely approximates 70% as determined using the SVD. The value of the approximation input metric 310 may also be used as a threshold for cutoff of certain operations. For example, if an approximation input metric 310 indicated a desired approximation of ~70%, in the example above for FIG. 9, if the top three kernels yield an approximation of 67% but the top four kernels yield an approximation of 72%, the system may determine to keep the top three kernel for that layer. Thus the approximation input metric 310 may be used to determine how many components from a particular operation to keep using an SVD analysis.

The system may also then insert into the modified convolutional layer 912 (which will be included in the approximated model 325) an upsampling operation 940 (which may involve matrix multiplication or other known techniques) so that the output data of the modified convolutional layer 912 has the appropriate dimensionality that is expected by the next layer of the approximated model 325. By removing a number of kernels and adding an upsampling operation, the new layer may result in a significant reduction of flops from the original layer.

In certain instances, upsampling may not be needed (or may only upsample to a smaller dimensionality that the original output data), particularly if the operations being removed from the layer do not significantly impact later layers. In such a situation, the later layers may be changed to expect the corresponding input of lesser dimensions. However, if the system takes a layer-by-layer approach to approximation, the upsampling operation allows the system to consider a single layer independently of other layers such that operations on one layer may be removed without necessarily reconfiguring a later layer to expect input data having different characteristics (e.g., a different number of dimensions).

The resulting new layer (e.g., layer 912) may approximate the original layer (e.g., layer 712). The value of the approximation may be represented by the cumulative score corresponding to the number of principal components from the SVD that were included in the new layer. In the example of FIG. 9, two kernels were included, thus the approximation score for the new layer is 61%. The approximation score for the layer may be used to compute the overall approximation score for the ultimate approximated model 325. In one approach the overall approximate score may be computed using a geometric mean from the approximation score for various layers. Other approaches for determining the overall approximate score may also be used.

The SVD operation described above describes an SVD operation being performed on the kernels of the layer. One or more SVD operations may also be performed along other axes of the operations of the trained model to reconstruct the operations of the model using fewer operations along a particular axes/dimension.

For example, SVD may be performed on a dimension of the 3D kernels. The result of the operation may yield a determination that only two dimensions from each kernel should be maintained. Thus the convolutional layer 712 may be modified to result in the convolutional layer 1012 of FIG. 10 that instead of including 10 3D kernels 720 now includes 10 2D kernels 1020. The layer 1012 may also be changed to include an upsampling component 1040 so that the output data 1030 matches the expected dimensionality for input into the next layer.

The system may perform SVD to assist with factorization of operations, using SVD component 406 and factorization component 408. Operations may be separated and factorized to provide speed increases to the network. For example, the system may analyze a convolution layer for the set of kernel-wise decompositions to apply to achieve a desired error/speedup ratio (such as that indicated by the approximation input metric 310). A layer may thus be transformed from a ($k \times k \times c_i \times c_o$) convolution to one of (1) ($1 \times 1 \times c_i \times N$) then ($k \times k \times N \times c_o$), (2) ($k \times k \times c_i \times N$) then ($1 \times 1 \times N \times c_o$) or (3) ($1 \times 1 \times c_i \times N_1$) then ($k \times k \times N_1 \times N_2$) then ($1 \times 1 \times N_2 \times c_o$). Decomposition/factorization operations in this manner may result in speed increases.

Separable factorization may be performed in different x and y dimensions. For example, each ($k \times k \times c_i \times c_o$) convolution may be decomposed into a set of ($k \times 1 \times c_i \times N$) convolutions and ($1 \times k \times N \times c_o$) convolutions if the error/speedup ratio is less than the threshold established by the approximation input metric 310.

Channel-wise factorization may also be performed. A ($k \times k \times c_i \times c_o$) convolution may be decomposed into $N*c_i$ separate $k \times k$ 2D convolutions to be applied per-channel, with each $c_i$ input channel having N 2D convolutions applied, together with a ($1 \times 1 \times N*c_i \times c_o$) convolution to reconstruct the original convolution. Because of the computational efficiency in computing 2D convolutions rather than 3D convolutions, this decomposition yields speedup as well.

For example, as illustrated in FIG. 7, input data 710 may have three channel (for example, RGB for image data). As shown in FIG. 11A, however, the input data may be split into three different channels resulting in input data slices 1110a, 1110b and 1110c. That input data may then be processed by a convolutional layer 1112 including, for example, a group of 2D kernels 1120. The system may determine which of the kernels 1120 operate on which channel and then only operate those particular kernels with respect to the input slice corresponding to that channel. For example, applying a particular kernel to the entire input data 710 is simply a waste of computing resources if that particular kernel only operates on one channel of the input data (for example the red channel of an image). The system may thus determine which subset of kernels for layer 1112 operate on what particular channel (e.g., slice) of the input data 1110a-1110c and may then only apply those kernels to the appropriate channels.

Thus, as shown in FIG. 11B, the system may determine the subset 1120a of kernels that operate on input slice 1110a, may determine the subset 1120b of kernels that operate on input slice 1110b and may determine the subset 1120c of kernels that operate on input slice 1110c. The individual kernel subsets may have equal or unequal numbers of kernels and may have overlapping or non-overlapping kernels among the different subsets. Then, kernel subset may be applied to each corresponding input data slice as shown in FIG. 11B. The resulting data is combined to form result 1125 which now has the appropriate dimensionality as if the kernels 1120 were applied to input data 710, only the factorization has resulted in separated calculations, thus avoiding operations of a kernel on portions of the input data that are not relevant to the output of that kernel and resulting in speed increases for the resulting approximated network.

Examples of factorization with convolutional and deconvolution networks are discussed below. As noted above, a convolutional layer with $A_o$ convolutional filters applies each filter to the entire input using all the input channels and produces $A_o$ output channels for each input. A deconvolutional layer with $A_o$ filters applies each filter to input data upsampled by $S_A$ and produces $A_o$ channels for each input. Both operations are applied as a matrix multiplication operation on the input data.

The weights of a convolutional layer can be factorized according to SVD factorization and turned into a low-rank multiplication approximation to split the convolution operation into two steps: (1) a kernel operation that does not change the number of channels in the input space, and (2) a 1×1 projection into an output space. If convolutional layers share the same input, multiple convolutional layers can be jointly decomposed into a single joint set of (potentially expensive) basis convolutions followed by separate 1×1 projections. A single convolutional layer W can be factored into two separate steps. To get a low-rank version of the output, use the top-B singular values from Sigma to get a reduced Sigma and V, but preserve the output layer size.

Thus, for a convolutional layer with $c_i$ input channels and $c_o$ output channels, the flop count would be $$\frac{hwc_ic_ok^2}{s^2} \tag{9}$$

For a low-rank 2 step convolution, after an SVD operation where V is a size (b, $c_i$, k, k) and UΣ is of a size ($c_o$, b, 1, 1), the flop count would be:

$$\frac{hwc_ibk^2}{s^2} + \frac{hwbc_o}{s^2} \tag{10}$$

Thus, to achieve a reduction in flop count using the SVD operation, b should have a value of:

$$b < \frac{c_ic_ok^2}{c_ik^2 + c_o} \tag{11}$$

This means that if the top-b singular values explain a large percentage of the variance in the weight tensor and satisfies this condition, there is minimal risk of accuracy loss. Thus, if a large portion of the variation is explained by the basis convolutions, there may be minimal accuracy loss.

Figure 12:
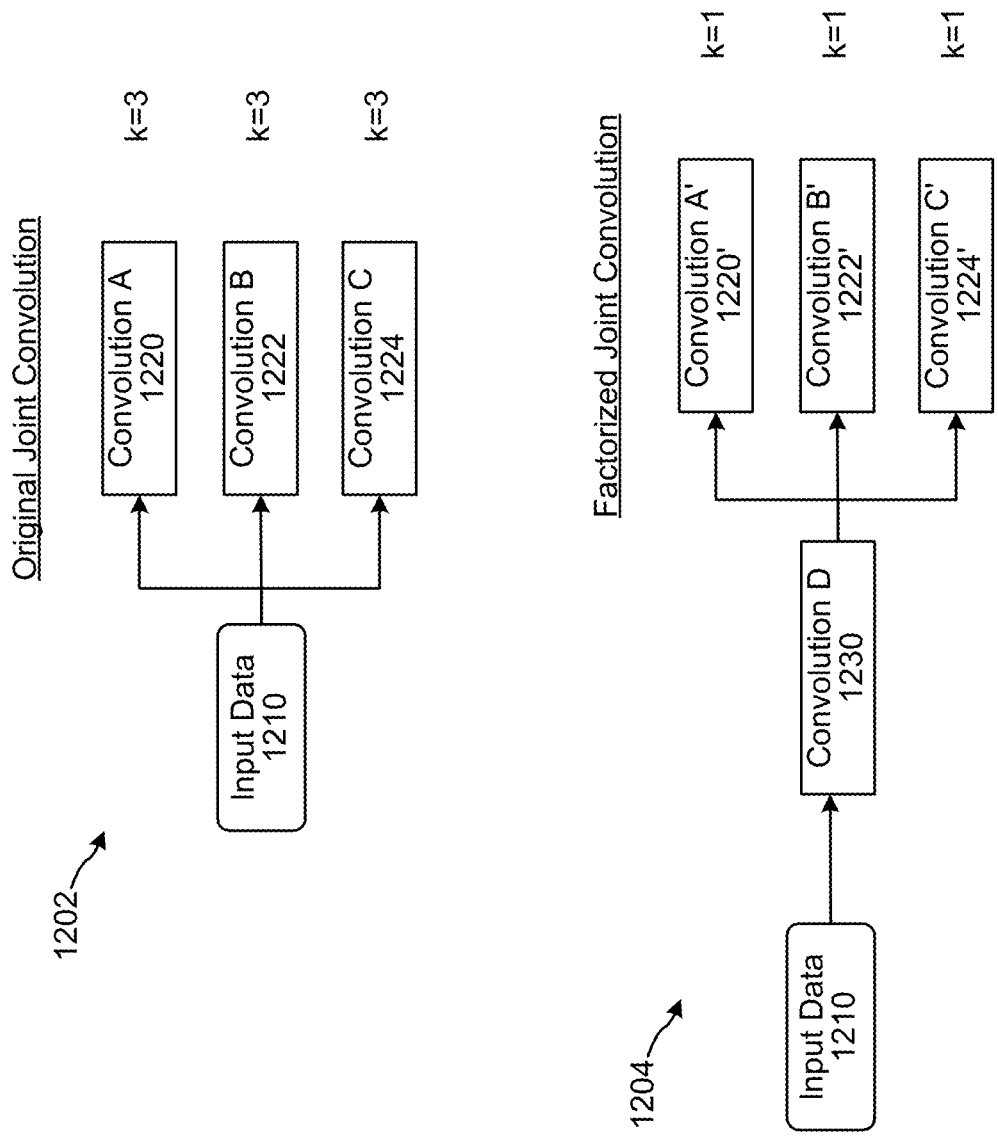
FIG. 12 illustrates an original joint convolution and factorized joint convolution according to embodiments of the present disclosure.

The system may also factorize joint convolutions. When multiple convolutional layers use the same layer as input, there may be a shared set of transformations applied to all the inputs. Instead of doing C separate convolutional layers on top of a single input, SVD can be applied to all filters in all C convolutional layers. Then, a single convolutional layer is applied to an input (to output a small number of output channels), and independent 1×1 convolutions are then applied to recover the original output sizes of all convolutions. For example, as shown in FIG. 12, original input data 1210 may be sent to convolution A 1220, convolution B 1222 and convolution C 1224, all with a kernel size of 3. That original convolution 1202 of the original trained model 220 may be replaced in the approximated model 325 with factorized joint convolution 1204 where the input data 1210 is processed by convolution D 1230, whose output is then sent to convolution A' 1220', convolution B' 1222', and convolution C' 1224', where each of those convolutions (A', B', and C') in the factorized arrangement perform upsampling now have a kernel size of 1. In a residual network architecture, or when there are multiple outputs, this situation arises at many of the residual units, or at the multiple output stages.

For a joint convolution, where the input layer Q is shared across C convolutional layers the original flop count may be expressed as:

$$\frac{hwk^2Q_iN}{s^2} \tag{12}$$

where $Q_i$ is the number of input channels and N is the total number of output channels of the C convolutional layers where N=($C_1$+$C_2$ . . . ). For the factorized joint convolution (such as 1204) where convolution D 1230 has B output channels and there are C 1×1 convolutional layers, the total flop count can be expressed as:

$$\frac{hwk^2Q_iB}{s^2} + \frac{hwBN}{s^2} \tag{13}$$

Thus, a speed increase will be realized in the approximated network when $$B < \frac{k^2Q_iN}{k^2Q_i + N} \tag{14}$$

Thus the system may configure a factorized convolution to replace a joint convolution to improve the speed of the approximated network.

The system may also factorize a single deconvolution operation into two steps (1) a low-rank deconvolutional kernel step to a small number of outputs, and (2) a 1×1 projection into the output space. For input channels $c_i$, output channels $c_o$, stride (upsampling factor) s, height h, width w, and kernel size k, the flop count for a deconvolutional layer may be expressed as:

$$hws^2c_ik^2c_o \quad (15)$$

For a low-rank two-step factorized deconvolutional operation with B output channels and a convolutional layer of kernel size 1, stride 1, input height h*s, input width w*s, input channels B and output channels $c_o$, the flop count may be expressed as:

$$hws^2c_ik^2B+hws^2Bc_o \quad (16)$$

Thus, a speed increase will be realized in the approximated network when $$B < \frac{c_ik^2c_o}{c_ik^2 + c_o} \quad (17)$$

Thus the system may configure a factorized a single deconvolution to replace a deconvolution to improve the speed of the approximated network.

The system may also factorize a joint deconvolution operation in a similar manner to factorizing a joint convolution. For a joint deconvolution, where the input layer Q is shared across C deconvolutional layers the original flop count may be expressed as:

$$s^2hwk^2Q_iN \quad (18)$$

where $Q_i$ is the number of input channels and N is the total number of output channels of the C deconvolutional layers where $N=(C_1+C_2 \ldots)$. For the factorized joint deconvolution where an initial deconvolution with B output channels is followed by C 1×1 following convolutional layers, the total flop count can be expressed as:

$$s^2hwk^2Q_iB+s^2hwBN \quad (19)$$

Thus, a speed increase will be realized in the approximated network when $$B < \frac{Q_ik^2N}{Q_ik^2 + N} \quad (20)$$

Thus the system may configure a factorized deconvolution to replace a joint deconvolution to improve the speed of the approximated network.

Other factorization operations other than those illustrated may also be performed. As with other operations, the factorization improvements in speed may be measured by a different in flop count. Further, the goodness improvement may be represented using the variance metric as determined during an SVD operation.

Another approximation technique includes quantization and may be performed by quantization component 410. Thus, using information about the data for the layers of a trained model, the quantization component 410 may compute a lower-bit quantization for layer weights to take advantage of lower-precision computational units in a graphical processing unit (GPU) or other hardware. For example, in a CNN that is configured to operate using 32-bit floating point operations, if various data in the network is configured to only use 16 (or fewer) bits worth of data, the system may restrict certain operations of the trained model to use only 16 bits of data, thus reducing the computing cost with regard to operations that otherwise would have been operating using 32 bits. The quantization component 410 may perform such quantization operations on a layer-by-layer basis, thus only quantizing operations for certain layers where they may increase speed without sacrificing too much accuracy for the particular layer. Thus, for a particular layer with a particular range value for input/output data, the quantization component 410 may reduce the number of bits used to operate that layer based on the range value. For quantization speed improvements may be determined using the bit decrease and hardware properties (for example 16 bits of data is twice as fast as 32 bits in a multiplication operation and twice as fast in the memory copying operation). Goodness approximation may be determined by a reconstruction error in the lower bits of the quantization approximation.

Using the approximation techniques described above, the system may configure an approximated model 325 that performs an approximation of the original trained model 220. The approximation techniques (e.g., combination, pruning, SVD, factorization, quantization, etc.) may be performed in any order. For example, the system may first combine layers, then perform SVD, and then prune layers. Or the system may first perform SVD, then quantize, then factorize, then combine layers. The order of approximations may also vary per layer. The system may first combine layers, then for a certain layer prune next but for another layer may perform SVD factorization next. Further, certain approximation operations may be performed different times using different operational parameters. For example, multiple SVD operations may be performed with regard to many different dimensions and axes, pruning may be performed with different thresholds for different values, etc.

The different order (and different aggressiveness, parameters, etc.) of approximation operations may result in different approximated models 325 from the same trained model 220. Depending on the construction of the particular trained model 220, there may be certain benefits to certain orders/aggressiveness for one trained model over another. In certain situations, it may be more beneficial overall to perform lossless techniques first followed by lossy techniques. But in other situations, it may be more beneficial to perform certain lossy techniques, followed by lossless techniques, followed by other lossy techniques. As can be appreciated, many different permutations of approximation techniques may be used.

As there are a number of different ways the system can determine an approximated model, the system may actually create a number of different approximated models 325 for a single input trained model 220. Each approximated model 325 may be created using a different combination of aggressiveness/permutation of approximation techniques. The option to select one or more of the group of approximated models may be presented to a user, for example, through a user interface that took a user's input as explained in reference to FIG. 5. Each approximated model 325 may also be given one or more scores, which may indicate the approximation, speed improvement and/or speed/approximation tradeoff of the particular model.

A scoring component 412 may score the approximated models. A number of different scoring techniques may be used. For example, to estimate the loss (or "goodness" of approximation) of a particular approximated model, the scoring component 412 may combine goodness scores from the respective approximation techniques, where each goodness score is estimated, for example, as a percentage from 0 to 1 with 1 being a perfect approximation. For example, for an SVD decomposition operation, the SVD score of the cumulative components that were retained may be used. If multiple SVD operations may be performed, the product of the respective SVD scores may be used as an estimation of the resulting goodness of the approximated model as a result of the SVD operations. Similarly, for factorization operations (either in x and y or channel-wise), the SVD score for the variance may be used. For channel-wise factorization, the SVD variance may be computed separately for each channel and weighed to determine the overall score. When multiple approximations are applied to a single layer, the product of the goodness metrics for all the individual approximations is used as the overall goodness for that new set of approximations. This is because the approximations result in a new set of layers that are applied successively to input data, which means any error introduced by one will be carried to the next. Thus, if the system performs three approximation operations on an original trained model 220 to create the approximated model 325 and the respective goodness scores of those operations are 0.82, 0.76, and 0.70, the overall goodness score for the approximated model would be 0.43624 (0.82×0.76×0.70). Thus, for an approximated matrix, a goodness score may be determined based on the goodness scores for the underlying approximation techniques.

The scoring component 412 may also determine speed scores for the approximated models. A number of different speed metrics may be used. In particular, flop count may be used as an approximation for speed. The lower the flop count, the faster the approximated model should run. Alternatively, a score metric combining flop count and memory usage may be used. Further, if the system knows the precise hardware that will be executing the approximated model 325 (information about the intended hardware may be provided by the user or included in metadata about the trained model 220), the system may more precisely predict the speed of the approximated model using the flop count and memory usage. Regardless of what combination of flops, memory usage, etc. that is used, the ultimate speed score may be represented as a number from 0 to 1 representing a normalized difference of speed from the original trained model 220 to the approximated model 325.

An overall score for each approximated model 325 may be determined using the respective model's goodness score and speed score. The overall score (for goodness and/or speed) may be determined using a geometric mean of scores for each layer, an average of scores for each layer, a weighted sum of goodness/speed where the scores of each layer are weighted by a respective weight for the layer, or other techniques. A listing of some or all of the approximated models created by the system may be output to the user, for example as shown in FIG. 13. The scores for the approximated models may be shown, along with a breakdown of an overall score, goodness score and speed score. Further, the output models may be ordered in relation to how they align with the approximation input metric 310. The system may also recommend one or more particular approximated models if their respective scores closely align with the approximation input metric 310.

The user may select one or more approximated models 325 and may indicate that they should be sent to/stored with a storage or service that stores the original trained model 220. The user may indicate that the original trained model 220 should be used at runtime under certain operation conditions (e.g., traffic, server load, latency metrics, etc.) while an approximated model 325 should be used in lieu of the trained model 220 under different operating conditions. The user may select multiple approximated models 325 and indicate the operating conditions under which one approximated model 325 should be used in lieu of other approximated models 325 or the trained model 220.

Thus, the model approximation system 350 may input a trained model 220 (and corresponding metadata) and approximation input metric 310 and perform a search over the set of approximations discussed above. At each stage, the model approximation system 350 may estimate the loss/approximation and speed increase. At each step of the search, the cumulative approximation score of operations thus far may be stored, recording the sequence of optimizations applied, together with the current speedup estimate and loss measurement for each individual step. When the search is complete, the potential speedup and the goodness score is calculated for the finished approximations. According to the approximation input metric 310, a score may be assigned to each set of approximations using the weighted sum of the goodness and the speedup, scaled by the speedup coefficient.

FIG. 14 is a block diagram conceptually illustrating example components of a computing device, such as the server(s) 120, which may perform model approximation as disclosed herein. Multiple servers 120 may be included in the system, such as one server 120 for performing certain aspects of model approximation, one server 120 for performing other aspects of model approximation, a different set of servers for operating the trained model and/or approximated model at runtime, etc. In operation, each of these devices (or groups of devices) may include computer-readable and computer-executable instructions that reside on the respective device 120, as will be discussed further below.

Each of device(s) 120 may include one or more controllers/processors 1404, which may each include a central processing unit (CPU) for processing data and computer-readable instructions, and a memory 1406 for storing data and instructions of the respective device. The memories 1406 may individually include volatile random access memory (RAM), non-volatile read only memory (ROM), non-volatile magnetoresistive memory (MRAM), and/or other types of memory. Each device 120 may also include a data storage component 1408 for storing data and controller/processor-executable instructions. Each data storage component 1408 may individually include one or more non-volatile storage types such as magnetic storage, optical storage, solid-state storage, etc. Each device 120 may also be connected to removable or external non-volatile memory and/or storage (such as a removable memory card, memory key drive, networked storage, etc.) through respective input/output device interfaces 1402.

Computer instructions for operating each device 120 and its various components may be executed by the respective device's controller(s)/processor(s) 1404, using the memory 1406 as temporary "working" storage at runtime. A device's computer instructions may be stored in a non-transitory manner in non-volatile memory 1406, storage 1408, or an external device(s). Alternatively, some or all of the executable instructions may be embedded in hardware or firmware on the respective device in addition to or instead of software.

Each device 120 includes input/output device interfaces 1402. A variety of components may be connected through the input/output device interfaces 1402. Through the network(s) 1499, the system 100 may be distributed across a networked environment. The I/O device interface 1402 may also include communication components that allow data to be exchanged between devices such as different physical servers in a collection of servers or other components. Additionally, each device 120 may include an address/data bus 1424 for conveying data among components of the respective device. Each component within a device 120 may also be directly connected to other components in addition to (or instead of) being connected to other components across the bus 1424.

As noted above, multiple devices may be employed in a single system. In such a multi-device system, each of the devices may include different components for performing different aspects of the system's processing. The multiple devices may include overlapping components. The components of the server(s) 120, as described herein, are exemplary, and may be located as a stand-alone device or may be included, in whole or in part, as a component of a larger device or system.

The components discussed above (e.g., the components of FIG. 4) may be operated as software, hardware, firmware, or some other combination of computing components.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principals and application of the disclosure and are not intended to be exhaustive or to limit the disclosure. Many modifications and variations of the disclosed aspects may be apparent to those of skill in the art. Persons having ordinary skill in the field of computers, machine learning, or related fields (such as computer vision, speech processing, etc.) should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first data representing structure and operations of a first trained convolutional neural network (CNN), wherein the first trained CNN:
   is configured to input image data of a first type,
   is configured to output image data of a second type,
   is configured to use a first amount of computing resources during operation,
   comprises a first convolutional layer configured to perform a first convolution operation on input data of a third type to output data of a fourth type, and
   comprises a second convolutional layer directly following the first convolutional layer, wherein the second convolutional layer is configured to perform a second convolution operation on the output data of the first convolutional layer to output data of a fifth type;
   receiving an input corresponding to a desired reduction of computing resources;
   configuring a third convolutional layer for a second trained CNN, wherein the third convolutional layer is configured to perform a third convolution operation on input data of the third type to output data of the fifth type, wherein the third convolution operation comprises a product of the first convolution operation and the second convolution operation;
   processing the first data to determine second data representing structure and operations of the second trained CNN comprising the third convolutional layer and excluding the first convolutional layer and second convolutional layer, wherein the second trained CNN is configured to:
   use input image data of the first type,
   output image data of the second type, and
   use a second amount of computing resources during operation, the second amount being less than the first amount;
   determining that the second amount corresponds to the desired reduction of computing resources; and
   outputting the second data representing the second trained CNN.

2. The computer-implemented method of claim 1, wherein the first trained CNN includes a fourth layer comprising a first plurality of kernels, and wherein the method further comprises:

performing a singular value decomposition operation using the first plurality of kernels to determine an ordered list of kernels; and
determining, using the input, a subset of the ordered list of kernels,
wherein the second trained CNN further comprises a fifth layer including the subset.

3. The computer-implemented method of claim 2, further comprising:
determining, using an output of the singular value decomposition operation, a first score indicating how closely the subset corresponds to the first plurality;
determining a second score corresponding to the input; and
determining the second trained CNN using the first score and second score.

4. The computer-implemented method of claim 3, further comprising:
determining a first number of floating point operations corresponding to execution of the first plurality of kernels;
determining a second number of floating point operations corresponding to execution of the subset of the ordered list of kernels;
determining a difference between the first number and the second number; and
determining, using the difference, a score corresponding to the second trained CNN.

5. A computer-implemented method comprising:
receiving first data representing a first trained neural network, wherein the first trained neural network is configured to:
use input data of a first type,
output data of a second type, and
use a first amount of computing resources during operation;
receiving an input corresponding to a desired reduction of computing resources;
processing the first data to determine second data representing a second trained neural network, wherein the second trained neural network is configured to:
use input data of the first type,
output data of the second type, and
use a second amount of computing resources during operation, the second amount being less than the first amount;
determining that the second amount corresponds to the desired reduction of computing resources; and
outputting the second data representing the second trained neural network.

6. The computer-implemented method of claim 5, wherein:
the first trained neural network comprises:
a first layer configured to perform a first operation on input data of a third type to output data of a fourth type, and
a second layer directly following the first layer, wherein the second layer is configured to perform a second operation on input data of the fourth type to output data of a fifth type; and
the processing the first data further comprises:
determining the first operation is a linear operation,
determining the second operation is a linear operation, and
configuring a third layer for the second trained neural network, wherein the third layer is configured to perform a third operation on input data of the third type to output data of the fifth type, wherein the third operation comprises a combination of the first operation and the second operation and wherein the second trained neural network does not include the first operation or the second operation.

7. The computer-implemented method of claim 5, wherein the first trained neural network includes a first layer comprising a first plurality of operations including at least a first operation, and wherein the method further comprises:
determining, using the input, a threshold value; and
determining that a parameter value corresponding to the first operation is below the threshold value,
wherein processing the first data further comprises determining a second layer of the second trained neural network that includes a second plurality of operations including a remainder of the first plurality of operations excluding the first operation.

8. The computer-implemented method of claim 5, wherein:
the first trained neural network comprises a first layer configured to perform a first operation using input data of a third type having a first number of bits to output data of a fourth type, and
processing the first data further comprises:
determining, using the input, a second number of bits less than the first number of bits, and
configuring a second layer for the second trained neural network, wherein the second layer is configured to receive input data of the third type having the first number of bits, convert the input data to second input data having the second number of bits, and perform the first operation using the second input data.

9. The computer-implemented method of claim 5, wherein the first trained neural network includes a first layer comprising a first plurality of operations, and wherein the method further comprises:
performing a singular value decomposition operation using the first plurality of operations to determine an ordered list of operations; and
determining, using the input, a subset of the ordered list of operations,
wherein processing the first data comprises a second layer of the second trained neural network that includes the subset of the ordered list of operations.

10. The computer-implemented method of claim 9, further comprising:
determining, using an output of the singular value decomposition operation, a first score indicating how closely the subset corresponds to the first plurality;
determining a second score corresponding to the input; and
selecting, from among a plurality of trained neural networks, the second trained neural network using the first score and second score.

11. The computer-implemented method of claim 10, further comprising:
determining a first number of floating point operations corresponding to execution of the first plurality of operations;
determining a second number of floating point operations corresponding to execution of the subset of the ordered list of operations;
determining a difference between the first number and the second number; and
determining, using the difference and the first score, a third score corresponding to the second trained neural network, wherein selecting the second trained neural network further uses the third score.

12. The computer-implemented method of claim 5, further comprising:
determining a first score corresponding to a difference between the second amount of computing resources and the first amount of computing resources;
determining a second score corresponding to how closely operations of the second trained neural network approximate operations of the first trained neural network;
determining a third score using the first score and the second score; and
selecting, from among a plurality of trained neural networks, the second trained neural network further using the third score.

13. A system comprising:
at least one processor; and
at least one memory including instructions that, when executed by the at least one processor, cause the system to:
receive first data representing a first trained neural network, wherein the first trained neural network is configured to:
use input data of a first type,
output data of a second type, and
use a first amount of computing resources during operation;
receive an input corresponding to a desired reduction of computing resources;
process the first data to determine second data representing a second trained neural network, wherein the second trained neural network is configured to:
use input data of the first type,
output data of the second type, and
use a second amount of computing resources during operation, the second amount being less than the first amount;
determine that the second amount corresponds to the desired reduction of computing resources; and
output the second data representing the second trained neural network.

14. The system of claim 13, wherein:
the first trained neural network comprises:
a first layer configured to perform a first operation on input data of a third type to output data of a fourth type, and
a second layer directly following the first layer, wherein the second layer is configured to perform a second operation on input data of the fourth type to output data of a fifth type; and
the instructions to process the first data further comprise instructions that, when executed by the at least one processor, further cause the system to:
determine the first operation is a linear operation,
determine the second operation is a linear operation, and
configure a third layer for the second trained neural network, wherein the third layer is configured to perform a third operation on input data of the third type to output data of the fifth type, wherein the third operation comprises a combination of the first operation and the second operation.

15. The system of claim 13, wherein the first trained neural network includes a first layer comprising a first plurality of operations including at least a first operation, and wherein the memory further comprises instructions that, when executed by the at least one processor, further cause the system to:
determine, using the input, a threshold value; and
determine that a parameter value corresponding to the first operation is below the threshold value,
wherein the instructions to process the first data further comprise instructions to determine a second layer of the second trained neural network that includes a second plurality of operations including a remainder of the first plurality of operations excluding the first operation.

16. The system of claim 13, wherein:
the first trained neural network comprises a first layer configured to perform a first operation using input data of a third type having a first number of bits to output data of a fourth type, and
the instructions to process the first data further comprise instructions that, when executed by the at least one processor, further cause the system to:
determine, using the input, a second number of bits less than the first number of bits, and
configure a second layer for the second trained neural network, wherein the second layer is configured to receive input data of the third type having the first number of bits, convert the input data to second input data having the second number of bits, and perform the first operation using the second input data.

17. The system of claim 13, wherein the first trained neural network includes a first layer comprising a first plurality of operations, and wherein the memory further comprises instructions that, when executed by the at least one processor, further cause the system to:
perform a singular value decomposition operation using the first plurality of operations to determine an ordered list of operations; and
determine, using the input, a subset of the ordered list of operations,
wherein the instructions to process the first data further comprise instructions to determine a second layer of the second trained neural network that includes the subset of the ordered list of operations.

18. The system of claim 17, wherein the instructions, when executed by the at least one processor, further cause the system to:
determine, using an output of the singular value decomposition operation, a first score indicating how closely the subset corresponds to the first plurality;
determine a second score corresponding to the input; and
select, from among a plurality of trained neural networks, the second trained neural network using the first score and second score.

19. The system of claim 18, wherein the instructions, when executed by the at least one processor, further cause the system to:
determine a first number of floating point operations corresponding to execution of the first plurality of operations;
determine a second number of floating point operations corresponding to execution of the subset of the ordered list of operations;
determine a difference between the first number and the second number; and
determine, using the difference and the first score, a third score corresponding to the second trained neural network,
wherein the instructions to select the second trained neural network further use the difference.

20. The system of claim 13, wherein the instructions, when executed by the at least one processor, further cause the system to:
- determine a first score corresponding to a difference between the second amount of computing resources and the first amount of computing resources;
- determine a second score corresponding to how closely operations of the second trained neural network approximate operations of the first trained neural network;
- determine a third score using the first score and the second score; and
- select, from among a plurality of trained neural networks, the second trained neural network further using the third score.

* * * * *